United States Patent
Jung et al.

(10) Patent No.: US 8,504,700 B2
(45) Date of Patent: Aug. 6, 2013

(54) METHOD, APPARATUS, AND SYSTEM FOR NEGOTIATING A SESSION BETWEEN AN ACCESS TERMINAL AND AN ACCESS NETWORK IN A HIGH RATE PACKET DATA SYSTEM

(75) Inventors: Jung-Soo Jung, Seongnam-si (KR);
Beom-Sik Bae, Suwon-si (KR);
Dae-Gyun Kim, Seongnam-si (KR);
Yu-Chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1478 days.

(21) Appl. No.: 11/294,484

(22) Filed: Dec. 6, 2005

(65) Prior Publication Data
US 2006/0123122 A1 Jun. 8, 2006

(30) Foreign Application Priority Data

Dec. 6, 2004 (KR) .................. 10-2004-0102044
Jan. 25, 2005 (KR) .................. 10-2005-0006890
Feb. 3, 2005 (KR) .................. 10-2005-0010270
Sep. 12, 2005 (KR) .................. 10-2005-0084730

(51) Int. Cl.
*G06F 15/16* (2006.01)
*H04W 72/00* (2009.01)

(52) U.S. Cl.
USPC ......... 709/228; 709/227; 455/450; 455/452.1

(58) Field of Classification Search
USPC .................. 709/228, 227; 370/310; 455/419, 455/410
See application file for complete search history.

(56) References Cited

U.S. PATENT DOCUMENTS 5,673,265 A * 9/1997 Gupta et al. .................. 370/432
5,878,225 A * 3/1999 Bilansky et al. .............. 709/227

(Continued)

FOREIGN PATENT DOCUMENTS

| JP | 2005-538599 A | 12/2005 |
| WO | WO-99/40719 | 8/1999 |
| WO | WO-0158108 | 8/2001 |
| WO | 2004/079947 | 9/2004 |

OTHER PUBLICATIONS

RFC2669, Aug. 1999, [online], [retrieved on Sep. 11, 2008]. Retrieved from the Internet <URL: http://www.faqs.org/ftp/rfc/pdf/rfc2669.txt.pdf>, pp. 1-2 & 11.*

(Continued)

*Primary Examiner* — Saleh Najjar
*Assistant Examiner* — Michael Chao
(74) *Attorney, Agent, or Firm* — Roylance, Abrams, Berdo and Goodman, L.L.P.

(57) ABSTRACT

A method, apparatus, and system for negotiating a session between an access terminal (AT) and an access network (AN) that can simplify a repeated negotiation procedure when the session is configured/updated/deleted between the AT and the AN. The AN performs protocol-by-protocol negotiations with the AT for a session configuration. The AN sends, to the AT, a soft configuration complete message including a continue bit indicating if another session configuration is added. The AN and the AT store a negotiated session configuration mapped to a personality index indicated in the message. When all session configurations have been completed, the AN and the AT determine if a session configuration currently in use has been changed. If the session configuration in use has not been changed, the AT and the AN maintain a physical channel. Moreover, the AN sends information indicating if a specific session configuration is applied after session configuration negotiation is completed.

27 Claims, 10 Drawing Sheets

U.S. PATENT DOCUMENTS

| | | | |
|---|---|---|---|
| 2002/0116501 A1* | 8/2002 | Ho et al. | 709/227 |
| 2003/0158959 A1 | 8/2003 | Jayapalan et al. | |
| 2003/0223383 A1* | 12/2003 | Chang et al. | 370/310 |
| 2004/0001536 A1* | 1/2004 | Lohtia et al. | 375/225 |
| 2004/0090937 A1* | 5/2004 | Chaskar et al. | 370/331 |
| 2004/0236947 A1 | 11/2004 | Chaudhurri et al. | |

OTHER PUBLICATIONS

CDMA2000, cdma2000 High Rate Packet Data Air Interface Specification, Mar. 2004, 3GPP2, Revision A, version 1.0, [online], retrieved from <3gpp2.org/Public_html/Specs/C.S0024-A_v1.0_040331.pdf>, pp. 1-81 as printed.*

Krutzfeldt, Remote Configuration of a Commercial Wireless Terminal—Preparation of a JAVA Specification Request, 2002, SDR Forum, [online], retrieved from <sdrforum.org/pages/sdr02/sy1-01%20kruetzfeldt.pdf>, pp. 1-6 as printed.*

CDMA_June_2005, cdma2000 High Rate Packet Data Air Interface Specification, Jun. 2005, 3GPP2, Revision A, version 2.0, [online], retrieved from <3gpp2.org/Public_html/Specs/C.S0024-A_v2.0_050727.pdf>, pp. 1-99 as printed.* cdma2000, High Rate Packet Data Air Interface Specification, Jul. 2005, Retrieved from the Internet <URL: 3gpp2.org/public_html/specs/C.S0024-A_v2.0_050727.pdf>, pp. 1-12 as printed.*

* cited by examiner

METHOD, APPARATUS, AND SYSTEM FOR NEGOTIATING A SESSION BETWEEN AN ACCESS TERMINAL AND AN ACCESS NETWORK IN A HIGH RATE PACKET DATA SYSTEM

CROSS-REFERENCE TO RELATED APPLICATIONS

This application claims the benefit under 35 U.S.C. §119 of Korean Patent Applications Serial Nos. 2004-102044, 2005-6890, 2005-10270, and 2005-84730, filed in the Korean Intellectual Property Office on Dec. 6, 2004, Jan. 25, 2005, Feb. 3, 2005, and Sep. 12, 2005, respectively, the entire disclosures of all of which are hereby incorporated by reference.

BACKGROUND OF THE INVENTION

1. Field of the Invention

The present invention generally relates to at method, apparatus, and system for negotiation between an access terminal and an access network in a mobile communication system. More particularly, the present invention relates to a method, apparatus, and system for negotiating a session between an access terminal and an access network that can simplify a repeated negotiation procedure when the session is configured/updated/deleted between the access terminal and the access network.

2. Description of the Related Art

With the quick development of communication technologies, mobile communication networks provide a high rate data service for enabling a multimedia service for e-mail, still and moving images, and so on, as well as a conventional voice service. Conventional mobile communication systems for supporting the high rate data service include Code Division Multiple Access 2000 1x (CDMA2000 1x), 1x Evolution Data Only (1xEV-DO), 1x Evolution for Data & Voice (1xEV-DV), asynchronous Universal Mobile Telecommunication Systems (UMTS), and so on. These mobile communication systems have a channel structure for high rate data transmission.

Among these mobile communication systems, the 1xEV-DO system is a high rate packet data system proposed by Third-Generation Partnership Project 2 (3GPP2) for data communication enhancement of an IS-2000 system. First, a channel structure of the 1xEV-DO system will be briefly described.

In the 1xEV-DO system, forward physical channels transmitted from an access network (AN) to an access terminal (AT) include a pilot channel, forward medium access control (MAC) channel, forward traffic channel, and forward control traffic. The forward physical channels are transmitted to the AT in a time division multiplexing (TDM) scheme. A user data packet is transmitted through the forward traffic channel of the forward physical channels. A control message and an encapsulated user data packet are transmitted through the forward control channel corresponding to a common channel. The forward MAC channel is used to transmit reverse rate control information, power control information, and so on.

In the 1xEV-DO system, reverse physical channels transmitted from the AT to the AN are different from the forward physical channels in that the reverse physical channels have different identification codes on an AT-by-AT basis. The AT-by-AT reverse channels are a pilot channel, reverse traffic channel, reverse data rate control (DRC) channel, reverse rate indicator (RRI) channel, access channel, and so on. A user data packet is transmitted through the reverse traffic channel. The access channel is used when the AT transmits a message or traffic to the AN before a traffic channel is connected. The DRC channel is used to notify the AN of the highest transmission rate at which the AT can receive data. The RRI channel is used to give notification of a transmission rate at which data is transmitted through the reverse traffic channel.

On the other hand, the AT is identified using an electronic serial number (ESN) in the conventional IS-2000 system. However, the 1xEV-DO system allocate, to each AT, a unicast access terminal identifier (UATI) instead of an ESN and identifies each AT using the UATI. The UATI is defined for a coverage area of an identical controller (Placket Control Function (PCF) entity or Radio Network Controller (RNC)), that is, each subnet. The UATI is configured by a subnet identifier part and an AT identifier part. When a 1xEV-DO terminal moves from one subnet to another, a new UATI configured by a new subnet identifier is assigned.

Accordingly, the 1xEV-DO terminal must be first assigned a UATI corresponding to an AT identifier to exchange data with the system. The AT receiving the UATI performs a process for negotiating protocol-by-protocol system parameters of each layer to exchange data with the AN in a method for transmitting data to and receiving data from the AN through a physical layer channel, a method for setting a transmission type and a data format in a MAC layer to transmit data, a method for maintaining an established call in a connection layer or transmitting and receiving data in the idle state, a method for separating, rearranging, and retransmitting higher layer data such as a Transmission Control Protocol/Internet Protocol (TCP/IP) packet, and so on.

In the process for negotiation of the system parameters, the AT and the AN exchange a predefined message and set up a dedicated channel to exchange the message. Because the dedicated channel is set up before parameters necessary for transmission are exchanged, the AT and the AN set up a dedicated traffic channel using predetermined default parameters and perform parameter negotiation. Hereinafter, negotiated system parameters and system variable sets are defined as a session configuration. A process for negotiating this session configuration is called a session configuration procedure. The session configuration is maintained and updated during one session, that is, a period in which data communication can be performed between the AT and the AN.

The session configuration procedure between the AT and the AN is divided into an AT initiated state for sending a request for desired parameters from the AT to the AN and an AN initiated state for proposing, to the AT, parameters that the AN desires to use. The AT or AN sends a list of parameter values to be used for one system parameter through a ConfigurationRequest message. If a value desired by a side for receiving the ConfigurationRequest message is present in the parameter value list, the receiving side sends a ConfigurationResponse message containing the desired value to a transmitting side.

However, if a value desired by the receiving side for receiving the ConfigurationRequest message is absent in the parameter value list, the receiving side performs a process for sending a list of desired parameter values capable of being supported by the receiving side to the transmitting side through the ConfigurationResponse message. Then, an associated system parameter can be set to a parameter value supported between the AT and the AN. Through the above process, the AT and the AN perform parameter negotiation for all protocols to be used. A side for requesting a parameter configuration sends a ConfigurationComplete message to the receiving side and stops the session configuration process. The AT and the AN between which the session configuration is completed release the traffic channel set up by the predetermined default parameters and use newly negotiated parameters.

The conventional session configuration procedure repeats a process for releasing and reconfiguring the traffic channel whenever a new session is configured. When a parameter value for a session Configuration other than a currently applied session configuration is added while the AT and the AN perform data communication using a specific session configuration, a process for releasing the traffic channel is equally performed as descried above. However, a repeat operation for releasing and reconfiguring the traffic channel as described above results in unnecessary service delay and degrades user service satisfaction, when a parameter of a previously configured session is also used in the next session configuration process, that is, a parameter to be used is not varied, The conventional session configuration procedure cannot delete a stored session configuration after completing negotiation between the AT and the AN. To delete a preset specific session, the AT and the AN wait for another session configuration to be negotiated and must use a method for overwriting a newly negotiated session configuration on a session configuration to be deleted. When all unnecessary session configuration is not deleted in the proper time, the AT and the AN must unnecessarily perform an operation for continuously managing an unused session configuration.

For example, this corresponds to the case where the AT moves to another subnet and a handoff is performed. In this case, the AN must receive session configuration values used in a previous subnet. Because a procedure for deleting an unnecessary session configuration is not provided in the conventional system a handoff target AN for the AT receives up to an unnecessary session configuration and therefore overhead occurs in terms of time and memory.

The conventional session configuration procedure cannot partially update stored session parameter values after completing negotiation between the AT and the AN. Accordingly, the AT and the AN must again perform a total session configuration process to update a specific session, resulting in unnecessary message transmission and reception and unnecessary waste of time.

SUMMARY OF THE INVENTION

It is, therefore, an object of the present invention to provide a method, apparatus, and system for negotiating a session between an access terminal and an access network that can reduce a repeated procedure when the session is negotiated between the access terminal and the access network in a high rate packet data system.

It is another object of the present invention to provide a method, apparatus, and system for negotiating a session between an access terminal and an access network that can exclude an operation for releasing a traffic channel when the session is negotiated between the access terminal and the access network in a high rate packet data system.

It is another object of the present invention to provide a method, apparatus, and system for negotiating a session between an access terminal and an access network that can send information indicating if a specific session configuration is applied from the access network to the access terminal when the session negotiation has been completed between the access terminal and the access network in a high rate packet data system.

It is another object of the present invention to provide a method, apparatus, and system for negotiating a session between an access terminal and an access network that can partially update parameter values when the session is negotiated between the access terminal and the access network in a high rate packet data system.

It is another object of the present invention to provide a method, apparatus, and system for negotiating a session between an access terminal and an access network that can easily delete a previous session configuration when the session is negotiated between the access terminal and the access network in a high rate packet data system.

In accordance with an exemplary aspect of the present invention, there is provided a method for performing session configuration negotiation in an access network of a high rate packet data system, the method comprising performing protocol-by-protocol negotiations with an access terminal for a session configuration, sending, to the access terminal, a soft configuration complete message comprising a session configuration continue bit indicating if an additional session configuration is required and a session configuration token field indicating a personality index of a session configuration to be applied, determining if a session configuration currently in use has been changed when all session configurations have been completed, and maintaining a physical channel associated with the access terminal if the session configuration currently in use has not been changed.

In accordance with another exemplary aspect of the present invention, there is provided a method for performing session configuration negotiation in an access terminal of a high rate packet data system, the method comprising performing protocol-by-protocol negotiations with an access network for a session configuration, receiving, from the access network, a soft configuration complete message comprising a session configuration continue bit indicating if an additional session configuration is required and a session configuration token field indicating a personality index of a session configuration to be applied; determining if a session configuration currently in use has been changed when all session configurations have been completed, and maintaining a physical channel associated with the access network if the session configuration currently in use has not been changed.

In accordance with another exemplary aspect of the present invention, there is provided a method for performing session configuration negotiation in an access network, of a high rate packet data system, the method comprising performing protocol-by-protocol negotiations with an access terminal for a session configuration, and sending, to the access terminal, a soft configuration complete message comprising a session commit bit indicating if a new session is applied when all session configurations have been completed.

In accordance with another examplary aspect of the present invention, there is provided a method for performing session configuration negotiation in an access terminal of a high rate packet data system, the method comprising performing protocol-by-protocol negotiations with an access network for a session configuration, and receiving, from the access network, a soft configuration complete message comprising a session commit bit indicating if a new session is applied when all session configurations have been completed.

In accordance with another exemplary aspect of the present invention, there is provided a method for performing session configuration negotiation between an access terminal and an access network in a high rate packet data system, the method comprising performing protocol-by-protocol negotiations for a session configuration between the access terminal and the access network, sending, to the access terminal, a soft configuration complete message comprising a session commit bit indicating that a new session is applied in the access network when all session configurations have been completed, and determining whether to maintain a physical channel in the access terminal and the access network on a basis of the session commit bit of the soft configuration complete message.

In accordance with another exemplary aspect of the present invention, there is provided a method for deleting a session configuration between an access network and an access terminal in a high rate packet data system, the method comprising sending a predetermined delete session message comprising a personality index indicating a session configuration to be deleted from a transmitting side of the access network and the access terminal to a receiving side, and deleting an associated session configuration mapped to the personality index in the receiving side that receives the delete session message.

In accordance with another exemplary aspect of the present invention, there is provided a method for updating a session configuration between an access network wad an access terminal in a high rate packet data system, the method comprising generating and/or activating an InConfiguration instance of a protocol using an associated parameter of a specific session configuration to the corrected in a transmitting side of the access network and the access terminal, receiving a message for generating and/or activating an associated InConfiguration instance from the transmitting side in a receiving side of the access network and the access terminal, performing negotiation of a parameter value to be updated in the access network and the access terminal using messages for parameter negotiation defined in an associated protocol, and storing an updated parameter value and other parameters of an associated session configuration in a personality index of an associated session configuration in the access network and the access terminal.

In accordance with another exemplary aspect of the present invention, there is provided a method for updating a session configuration between an access network and an access terminal in a high rate packet data system, the method comprising sending a request for updating a specific configuration attribute from a transmitting side of the access network and the access terminal to the other side, determining if the configuration attribute is used in a receiving side receiving the update request and sending a response to the update request to the transmitting side, and applying the updated configuration attribute in both the access network and the access terminal when the receiving side receiving the update request accepts use of the configuration attribute.

In accordance with another exemplary aspect of the present invention, there is provided a method for updating a session configuration in a transmitting side that transmits an update request when the session configuration is updated between an access network and an access terminal in a high rate packet data system, the method comprising sending to a receiving side a predetermined personality update request message indicating a specific configuration attribute of the session configuration to be updated, receiving a response indicating if the configuration attribute is used from the receiving side that receives the update request, and applying an updated configuration attribute when the receiving side accepts use of the configuration attribute.

In accordance with another exemplary aspect of the present invention, there is provided a method for updating a session configuration in a receiving side that receives an update request when the session configuration is updated between an access network and an access terminal in a high rate packet data system, the method comprising receiving a predetermined personality update request message indicating a specific configuration attribute of the session configuration to be updated, sending a response indicating if the configuration attribute is used to a transmitting side that sends the personality update request message, and applying an updated configuration attribute when the receiving side accepts use of the configuration attribute.

In accordance with another exemplary aspect of the present invention, there is provided a high rate packet data system for negotiating at least one session configuration between an access network and an access terminal, the system comprising an access network for negotiating with an access terminal on at least one session configuration on a protocol-by-protocol basis, determining if a session configuration currently in use has been changed when all session configurations have been completed, and sending, to the access terminal, a soft configuration complete message comprising a session configuration continue bit indicating if an additional session configuration is required and a session configuration token field indicating a personality index of a session configuration to be applied, and the access terminal for negotiating with the access terminal on a plurality of session configurations on the protocol-by-protocol basis, wherein a physical channel currently being set up is maintained between the access network and the access terminal if the session currently in use has not been changed.

In accordance with another exemplary aspect of the present invention, there is provided an access network for negotiating a session configuration to communicate with at least one access terminal in a high rate packet data system, the network comprising an access network controller (ANC) for controlling an access network transceiver system (ANTS) for transmitting a radio signal to, and receiving a radio signal from, the at least one access terminal, the ANC comprising control means for negotiating with the at least one access terminal on at least one session configuration, sending, to the at least one access terminal, a predetermined soft configuration complete message comprising a session commit bit indicating if a new session is applied when all session configurations have been completed, and maintaining a preset physical channel associated with the at least one access terminal when a current session configuration is continuously used.

In accordance with another exemplary aspect of the present invention, there is provided an access terminal for negotiating a session configuration to communicate with an access network in a high rate packet data system, the terminal comprising a radio frequency (RF) processor for frequency converting an RF signal to be transmitted to and received from an access network, a modulator-demodulator (MODEM) for processing a baseband signal of a message to be transmitted to and received from the access network, and a controller for negotiating with the access network on at least one session configuration, receiving, from the access network, a soft configuration complete message comprising a session commit bit indicating if it new session configuration is applied when all session configurations have been completed, and maintaining a preset physical channel associated with the access network when the current session configuration is continuously used according to a result of checking the session commit bit.

In accordance with another exemplary aspect of the present invention, there is provided an access network for negotiating a session configuration to communicate with at least one access terminal in a high rate packet data system, the access network comprising control means for negotiating with at least one access terminal on at least one session configuration, sending to the at least one access terminal a predetermined delete session message comprising a personality index indicating at least one session configuration to be deleted when the at least one session configuration to be deleted is present in at least one negotiated session configuration, and deleting the at least one indicated session configuration from a memory.

In accordance with another exemplary aspect of the present invention, there is provided an access terminal for negotiating a session configuration to communicate with an access network in a high rate packet data system, the access terminal comprising a controller for negotiating with an access network on at least one session configurations and deleting at least one indicated session configuration from a memory when receiving from the access network a predetermined delete session message comprising a personality index indicating at least one session configuration to be deleted.

In accordance with another exemplary aspect of the present invention, there is provided a transmitter for negotiating a session configuration to communicate with at least one receiver in a high rate packet data system, the transmitter comprising control means for negotiating with at least one receiver on at least one session configuration through a communication interface, and sending to the at least one receiver a predetermined InConfiguration instance activation message for generating and/or activating an InConfiguration instance of an associated protocol when a parameter of a specific session configuration to be updated is generated.

In accordance with another exemplary aspect of the present invention, there is provided a receiver for negotiating a session configuration to communicate with at least one transmitter in a high rate packet data system, the receiver comprising control means for negotiating with at least one transmitter on at least one session configuration through a communication interface, and negotiating with the at least one transmitter on an update target parameter value when receiving from the at least one transmitter a predetermined InConfiguration instance activation message of a request for generating and/or activating an InConfiguration instance of an associated protocol to update a specific parameter of a specific session configuration.

In accordance with another exemplary aspect of the present invention, there is provided a transmitter for negotiating a session configuration to communicate with at least one receiver in a high rate packet data system, the transmitter comprising control means for negotiating with at least one receiver on at least one session configuration through a communication interface, sending to the at least one receiver a predetermined personality update request message comprising a configuration attribute value associated with a request for updating an associated parameter when a specific parameter of a specific session configuration to be updates generated, receiving a response message from the at least one receiver, and determining whether to update the configuration attribute value.

In accordance with yet another exemplary aspect of the present invention, there is provided a receiver for negotiating a session configuration to communicate with at least one transmitter in a high rate packet data system, the receiver comprising control means for negotiating with at least one transmitter on at least one session configuration through a communication interface, and sending to the at least one transmitter a response message indicating if a configuration attribute value is updated when receiving from the at least one transmitter a predetermined personality update request message comprising the configuration attribute value associated with a request for updating an associated parameter.

BRIEF DESCRIPTION OF THE DRAWINGS

The above and other exemplary objects and advantages of the present invention will be more clearly understood from the following detailed description taken in conjunction with the accompanying drawings, in which like reference numerals will be understood to refer to like parts, components and structures, where.

DETAILED DESCRIPTION OF EXEMPLARY EMBODIMENTS

Certain exemplary embodiments of the present invention will be described in detail herein below with reference to the accompanying drawings. In the following description, detailed descriptions of functions and configurations incorporated herein that are well known to those skilled in the art are omitted for clarity and conciseness.

For a better understanding of exemplary embodiments of the present invention, a conventional session configuration process performed in a high rate packet data system such as a 1x Evolution Data Only (1xEV-DO) system will be described with reference to FIG. 1. That is, FIG. 1 illustrates a process for negotiating a session configuration between an access terminal (AT) 10 and an access network (AN) 20 in a conventional high rate packet data system.

Figure 1:
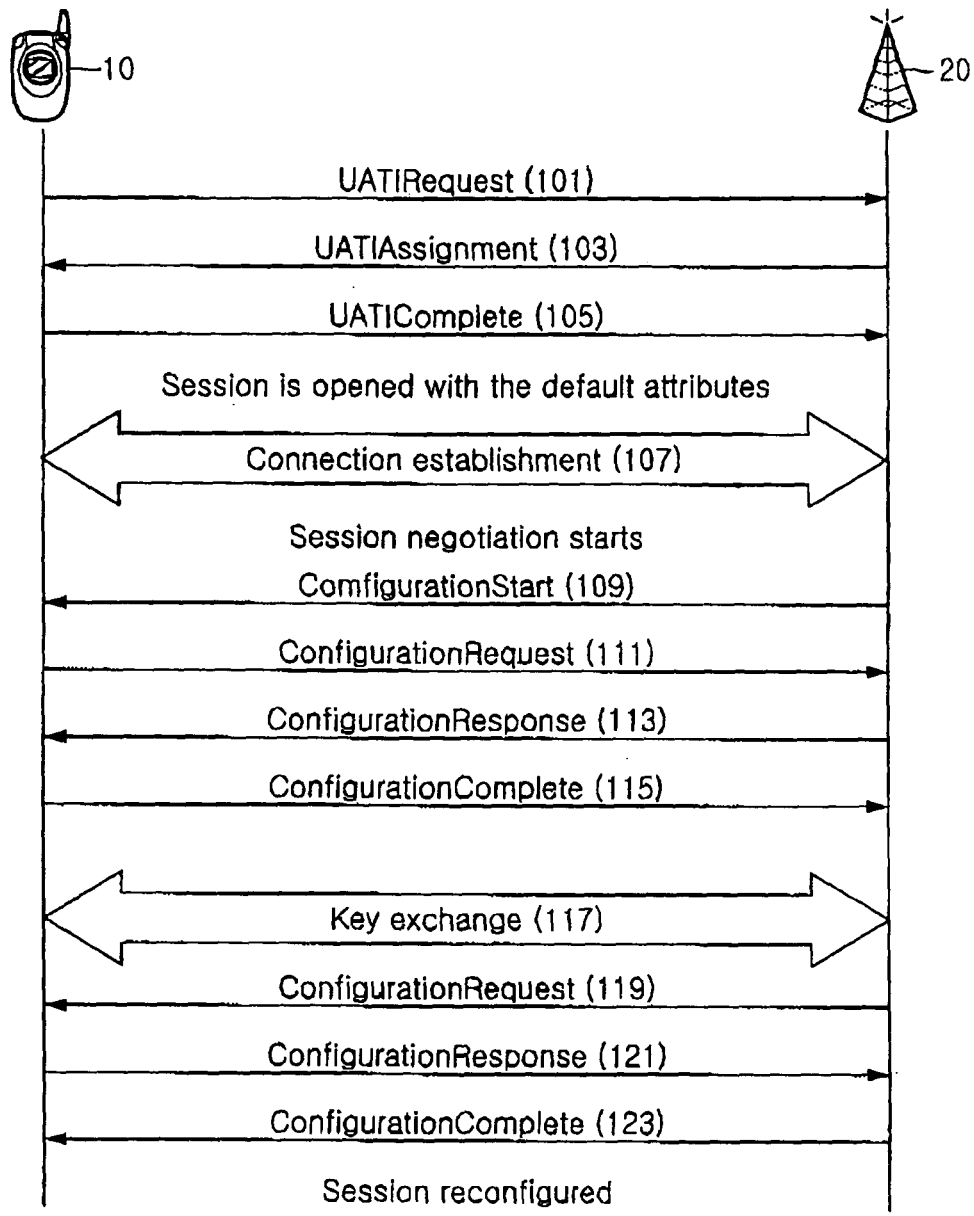
FIG. 1 illustrates a process for negotiating a session configuration between an access terminal (AT) and an access network (AN) in a high rate packet data system.

In FIG. 1, a new unicast access terminal identifier (UATI) is assigned from the AN 20 to the AT 10 in steps 101 to 105, and a traffic channel is set up using default parameter values in step 107. The AN 20 sends a ConfigurationStart message to the AT 10 through the traffic channel in step 109. A session configuration procedure of an AT initiated state is started.

In the AT initiated state, the AT 10 and the AN 20 exchange a ConfigurationRequest message and a ConfigurationResponse message and set a desired parameter value for a specific parameter in steps 111 and 113. When the desired parameter value is completely set, the AT 10 sends a ConfigurationComplete message to the AN 20 to stop the session configuration of the AT initiated state in step 115. A session configuration procedure of an AN initiated state is started.

In the AN initiated state, the AN 20 allocates predetermined encryption key values to the AT 10 in step 117. Then, a ConfigurationRequest message and a ConfigurationResponse message are exchanged and a desired parameter value for a specific parameter is set in steps 119 and 121. When the desired parameter value is completely set, the AN 20 sends, to the AT 10, a ConfigurationComplete message indicating that a total session configuration process has been completed in step 123.

The high rate packet data system uses a data structure based on a configuration attribute form at the time of negotiation of parameters for a session configuration. A parameter identifier and a parameter value configure a configuration attribute. When parameter negotiation is performed, the AT and the AN propose a parameter value using an associated configuration attribute and store a result of the negotiation in the form of the associated configuration attribute.

When the high rate packet data system as illustrated in FIG. 1 updates a session while multiple sessions are used, different parameter values can be used on a subnet-by-subnet basis also between identical parameters based on identical protocols. When moving to a subnet of another AN, the AT is assigned at now UATI mapped to the subnet and performs an operation for updating a session configuration through a new session configuration procedure. Because a request and response for parameters to be used for all protocols are repeated when the session configuration is negotiated, a long period of time is required. When a subnet is changed, the user experiences service interruption for a long period time.

To address this problem, a method has been proposed. In the proposed method, the AT and the AN negotiate with each other at the time of an initial session configuration and store information about a plurality of different session configurations or a subnet-by-subnet basis. In this case, the session configuration information of an associated subnet stored in advance is called and used when a subnet is actually changed, such that the session configuration time can be significantly reduced. As described above, the method for storing in advance information about a plurality of sessions is referred to as a multi-session configuration) procedure.

Like the session configuration procedure of FIG. 1, the multi-session configuration procedure is divided into an AT initiated state for sending a request for desired parameters from the AT to the AN and an AN initiated state for proposing, to the AT, parameters that the AN desires to use. The AT or AN sends a list of parameter values to be used for one system parameter through a ConfigurationRequest message. If a value desired by a side for receiving the ConfigurationRequest message is present in the parameter value list, the receiving side sends a ConfigurationResponse message containing the desired value to a transmitting side.

However, if a value desired by the receiving side for receiving the ConfigurationRequest message is absent in the parameter value list, the receiving side performs a process for sending a list of desired parameter values capable of being supported by the receiving side to the transmitting side through the ConfigurationResponse message. Then, an associated system parameter can be set to a parameter value supported between the AT and the AN.

When parameter negotiation for all protocols is completed in the AN initiated state, the AN sends a predetermined SoftConfigurationComplete message to the AT and notifies the AT that the negotiation of one session configuration has been completed. Along with a personality index for identifying an associated session configuration, the SoftConfigurationComplete message is sent to the AT. The AT and the AN store the completed session configuration in a value of a personality index mapped thereto.

After one session configuration is completed, the AN desiring to initiate another session configuration, for example, sets a predetermined Session Configuration Continue bit to '1'. The Session Configuration Continue bit is contained in the. SoftConfigurationComplete message when the message is sent. When receiving the SoftConfigurationComplete message in which the Session Configuration Continue bit has been set to '1', the AT takes the transition to the AT initiated state, initiates a new session configuration, and repeats the above-described process.

When all session configurations have been completed according to the above-described process, the AN sends, to the AT, the SoftConfigurationComplete message in which the Session Configuration Continue bit has been set to '0' to indicate that all the session configurations have been completed. Among a plurality of session configuration values of the SoftConfigurationComplete message, a predetermined session configuration token is sent which indicates a personality index to be used after the session configuration is stopped. The AT and the AN release a traffic channel set up by preset default parameters and apply parameters mapped to a session configuration token to each protocol.

When one or more sessions are negotiated in the conventional high rate packet data system as described above, the traffic channel set up by the default parameters must be released after the session configuration is completed. Accordingly, there is a problem in that the session configuration is delayed.

In contrast to conventional methods, an exemplary embodiment of the present provides a method capable of adding a new session configuration without releasing a traffic channel. According to an exemplary implementation of the present invention, the AT and the AN complete session configuration negotiation without releasing a traffic channel when it is determined that a session configuration in use has not been changed after all session configurations are completed.

First, certain exemplary basic conditions for the AT and the AN in accordance with an exemplary embodiment the present invention will be described.

In the high rate packet data system to which an exemplary implementation of the present invention may be applied, the AT receives, from the AN, a SoftConfigurationComplete message in which the Session Configuration Continue bit has been set to '0' when the session configuration is stopped. In this case, if a personality index of a session configuration currently being used indicates the same session as indicated by a SessionConfigurationToken of the SoftConfigurationComplete message in the first condition and another session configuration is not overwritten on the session configuration currently being used in the second condition, the session configuration negotiation can be stopped without releasing a physical channel, that is, a traffic channel because it is determined that the session configuration currently being used has not been changed. If recovery of a previous session is not agreed between the AT and the AN in the third condition in addition to the first and second conditions, the session configuration negotiation can be stopped Without releasing the physical channel after a determination is made as to whether the session configuration has been changed.

In the high rate packet data system to which an exemplary implementation of the present invention may be applied, the AN has the same conditions as the AT. The AN sends, to the AT, a SoftConfigurationComplete message in which the Session Configuration Continue bit has been set to '0' when the session configuration is completed. In this case, if a personality index of a session configuration currently being used indicates the same session as indicated by a SessionConfigurationToken of the SoftConfigurationComplete message in the first condition and another session configuration is not overwritten on the session Configuration currently being used in the second condition, the session configuration negotiation can be stopped without releasing a traffic channel. If recovery of a previous session is riot agreed between the AT and the AN in the third condition in addition to the first and second conditions, the session configuration negotiation can be stopped without releasing the traffic channel after a determination is made as to whether the session configuration has been changed.

Exemplary operations of the AT and the AN to which a method based on the basic exemplary conditions is applied in accordance with an exemplary aspect the present invention will be described with reference to FIGS. 2 and 3.

Figure 2:
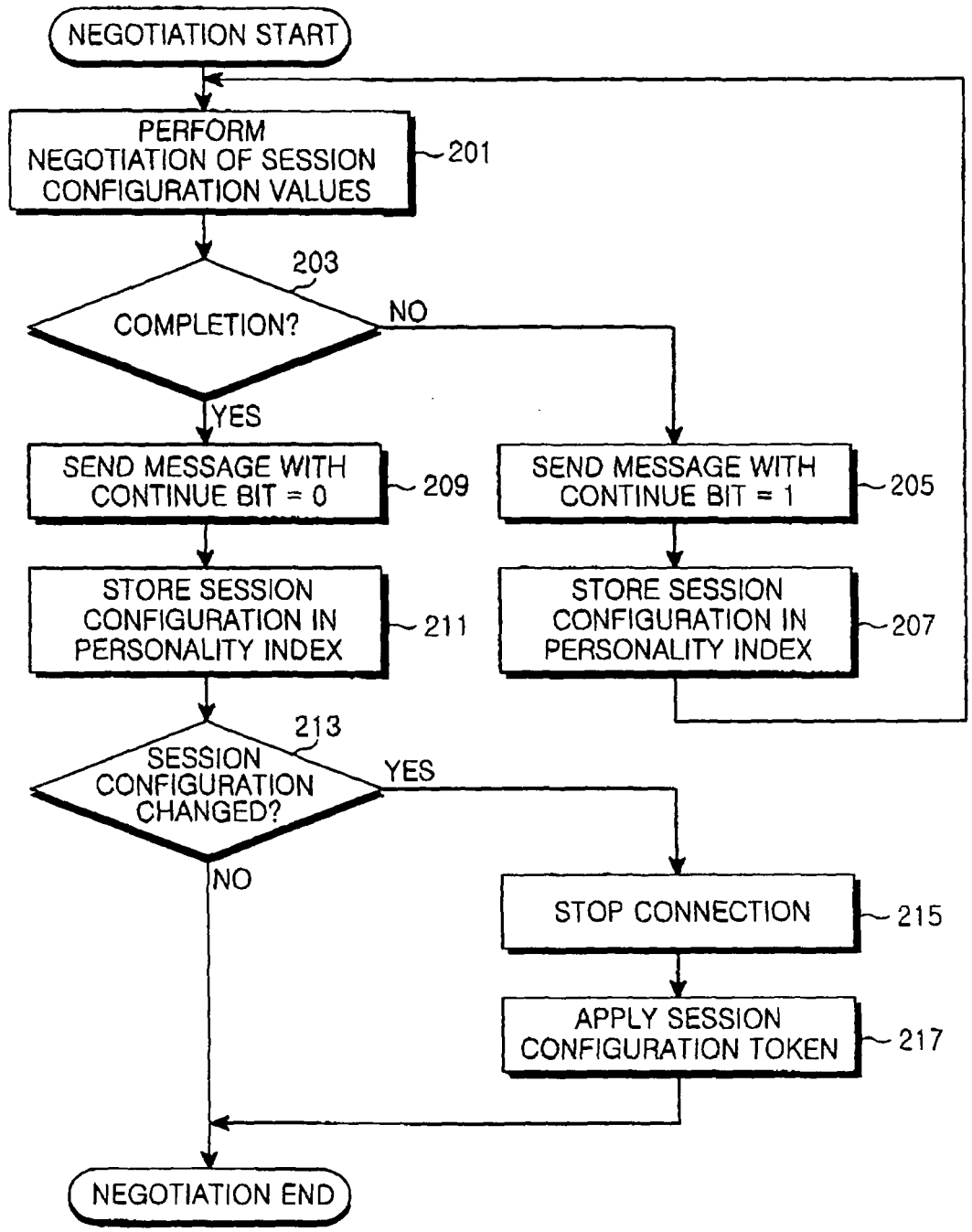
FIG. 2 is a flowchart illustrating a method for negotiating a session configuration in the AN of the high rate packet data system in accordance with an exemplary embodiment of the present invention.

FIG. 2 is a flowchart illustrating a method for negotiating a session configuration in the AN of the high rate packet data system in accordance with an exemplary embodiment of the present invention.

In step 201, the AN performs protocol-by-protocol negotiations for one session configuration. After the negotiation of one session configuration is completed, the AN determines if an additional session configuration is required in step 203. When additional session negotiation is required, the AN, for example, sends, to the AT, a SoftConfigurationComplete message in which a Session Configuration Continue bit has been set to '1' in step 205. Then, the AN stores a just previously negotiated session configuration in a personality index described in the SoftConfigurationComplete message in step 207. Then, the AN proceeds to step 201 to perform negotiation for the next session configuration.

However, if the AN determines that additional session negotiation is not required because all session configurations have been completed in step 203, the AN, for example, sends, to the AT, a SoftConfigurationComplete message in which the Session Configuration Continue bit has been set to '0' in step 209. Then, the AN stores a just previously negotiated session configuration in a personality index described in the SoftConfigurationComplete message in step 211. Then, the AN determines if the session configuration currently being used has been changed using the above-described conditions in step 213.

The AN considers the three conditions as described above in step 213. If a personality index of a session configuration currently being used indicates the same session as indicated by a SessionConfigurationToken of the SoftConfiguration-Complete message, the personality index of the session configuration currently being used has not been updated in a previous session negotiation process, and recovery of a previous session has not been negotiated between the AT and the AN, the AN determines that the session configuration currently being used has not been changed and then stops the session configuration process.

However, the AN determines that the session configuration currently beings used has been changed if any one of the three conditions is unsatisfied in step 213. Then, the AN releases the traffic channel set up in the session configuration currently being used and stops a connection to the AT in step 215. The AN applies a newly changed session configuration, that is, a session configuration mapped to a SessionConfigurationToken described in the SoftConfigurationComplete message in step 217.

Figure 3:
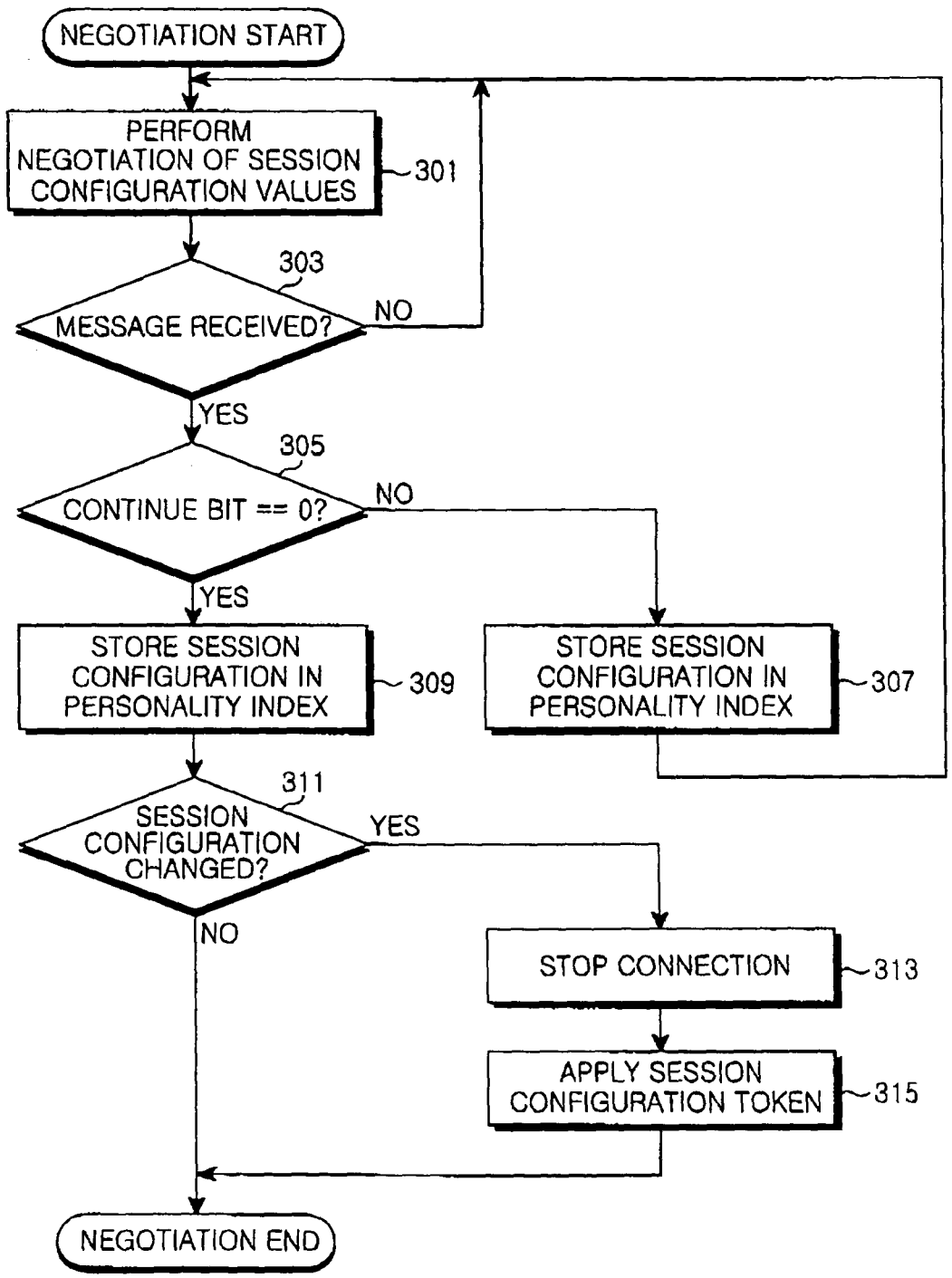
FIG. 3 is a flowchart illustrating a method for negotiating a session configuration in the AT of the high rate packet data system in accordance with all exemplary embodiment of the present invention.

FIG. 3 is a flowchart illustrating a method for negotiating a session configuration in the AT of the high rate packet data system in accordance with an exemplary embodiment of the present invention.

In step 301, the AT performs protocol-by-protocol negotiation is for one session configuration. The AT performs the session configuration negotiation of step 301 until a SoftConfigurationComplete message is received in step 303. When the SoftConfigurationComplete message is received in step 303, the AT determines if a Session Configuration Continue bit of the SoftConfigurationComplete message has been set to '0' and determines if all session configurations have been completed in step 305.

If the Session Configuration Continue bit has been set to '1', that is, all the session configurations have not been completed, as a result of the determination, the AT stores a just previously negotiated session configuration in a personality index described in the SoftConfigurationComplete message. Then, the AT proceeds to step 301 to perform negotiation for the next session configuration. However, when the AT receives the SoftConfigurationComplete message in which the Session Configuration Continue bit has been set to '0' in step 303, the AT stores a just previously negotiated session configuration in a personality index described in the SoftConfigurationComplete message in step 309. Then, the AN determines if the session configuration currently being used has been changed in step 311.

The AT considers the three conditions as described above in step 311. If a personality index of a session configuration currently being used indicates the same session as indicated by a SessionConfigurationToken of the SoftConfiguration-Complete message, the personality index of the session configuration currently being used has not been updated in a previous session negotiation process, and recovery of a previous session has not been negotiated between the AT and the AN, the AT determines that the session configuration Currently being used has not been changed and then stops the session configuration process.

However, the AT determines that the session configuration currently being used has been changed if any one of the three conditions is unsatisfied in step 311. Then, the AT releases the traffic channel set up in the session configuration currently being used and stops a connection to the AN in step 313. The AT applies a newly changed session configuration, i.e., a session configuration mapped to a SessionConfigurationToken described in the SoftConfigurationComplete message in step 315.

A Session configuration method in accordance with another exemplary embodiment of the present invention will be described.

In this exemplary embodiment, the AT does not determine if a session configuration currently being used has been changed, but the AN designates information indicating if the session configuration is applied. In this exemplary method, the AN can indicate if a specific session configuration is applied after session configuration negotiation has been completed. When the AN indicates that a specific session configuration is applied, the AT releases a physical channel find uses the session configuration designated by the AN. However, when the AN does not indicate that a specific session configuration is applied, the AT completes the session configuration negotiation without releasing the physical channel.

For example, an AT based on 1xEV-DO will now be described. When the session configuration negotiation is completed and the SoftConfigurationComplete message in which the Session Configuration Continue bit has been set to '0' is received, the AT reads a predetermined Session Commit bit of a Commit field sent along with a Session Configuration Continue bit and determines if a specific session is applied. When the Session Commit bit is set to '1', the AT applies a session configuration of a personality index corresponding to a SessionConfigurationToken sent along with the SoftConfigurationComplete message. In this process, a physical channel can be released. However, the AT continuously maintains the session configuration currently being used without releasing the physical channel when receiving the SoftConfigurationComplete message in which the Session Commit bit has been set to '0'.

For example, an AN based on 1xEV-DO will now be described. When session configuration negotiation is completed, a SoftConfigurationComplete message is sent in which the Session Configuration Continue bit has been set to '0'. When a session configuration mapped to a specific personality index is desired to be applied after the session configuration negotiation, the Session Commit bit of the SoftConfigurationComplete message is set to '1' and the SoftConfigurationComplete message is sent along with a SessionConfigurationToken corresponding to the personality index to be applied. Then, the session configuration of the personality index corresponding to the sent SessionConfigurationToken is applied. In this process, the physical channel can be released. However, when desiring to continuously use the current session configuration after the session configuration negotiation, the AN sends the SoftConfigurationComplete message in which the Session Commit bit has been set to '0', and continuously maintains the session configuration currently being used.

Table 1 shows fields of a proposed SoftConfigurationComplete message for indicating if a specific session configuration is applied in the AN.

TABLE 1

| Field | Length (bits) |
|---|---|
| MessageID | 8 |
| TransactionID | 8 |
| PersonalityIndexStore | 4 |
| Continue | 1 |
| Commit | 0 or 1 |
| SessionConfigurationToken | 0 or 16 |
| Reserved | 0-7 (as needed) |

In Table 1, the MessageID field is used for distinguishing between different messages, and is set as a message identifier for indicating the SoftConfigurationComplete message. The TransactionID field is an identifier used for distinguishing between different SoftConfigurationComplete messages. Whenever a new SoftConfigurationComplete message is configured, a remainder obtained by dividing a value incremented by one by 256 ($2^8$) is designated and sent in the TransactionID field. The PersonalityIndexStore field indicates a personality index in which a negotiated session configuration is stored.

When a received SoftConfigurationComplete message is the first SoftConfigurationComplete message after the session configuration negotiation is initiated, the AT stores, in an indicated personality index, session configuration values negotiated until the SoftConfigurationComplete message is received from the time when the session configuration negotiation is initiated. When the received SoftConfigurationComplete message is not the first SoftConfigurationComplete message, the AT stores, in an indicated personality index, session configuration values negotiated until a current SoftConfigurationComplete message is received from the time when a previous SoftConfigurationComplete message is received.

When a sent SoftConfigurationComplete message is the first SoftConfigurationComplete message after the session configuration negotiation is initiated, the AN stores, in an indicated personality index, session configuration values negotiated until the SoftConfigurationComplete message is sent front the time when the session configuration negotiation is initiated. When the sent SoftConfigurationComplete message is not the first SoftConfigurationComplete message, the AN stores, in an indicated personality index, session configuration values negotiated until a current SoftConfigurationComplete message is sent from the time when a previous SoftConfigurationComplete message is sent.

In Table 1, the Continue field indicates if a session configuration mapped to a new personality index is continued. When the Continue field has a value of '1', a session configuration mapped to a new personality index is continued. When the Continue field hits a value of '0', the session configuration is stopped. In Table 1, the Commit field indicates if a specific session configuration is committed. This Commit field is included in the message only when the Continue field has a value of '0'.

When the Commit field has a value of '1', the AT and the AN use a session configuration mapped to a personality index indicated by the SessionConfigurationToken field of Table 1. In this case, the AT and the AN release the physical channel. The SessionConfigurationToken field indicates a personality index to be applied, and is included in the message only when the Commit field has the value of '1'. The AT and the AN use a session configuration mapped to a personality index with the same value as that of 4 more-significant bits of the SessionConfigurationToken field. In this exemplary embodiment, the SessionConfigurationToken field is preferably set to 16 bits. A personality index is set to 4 bits, but the number of bits of the personality index is viable.

Next, a session configuration method in accordance with another exemplary embodiment of the present invention will be described in more detail with reference to FIGS. 4 and 5.

Figure 4:
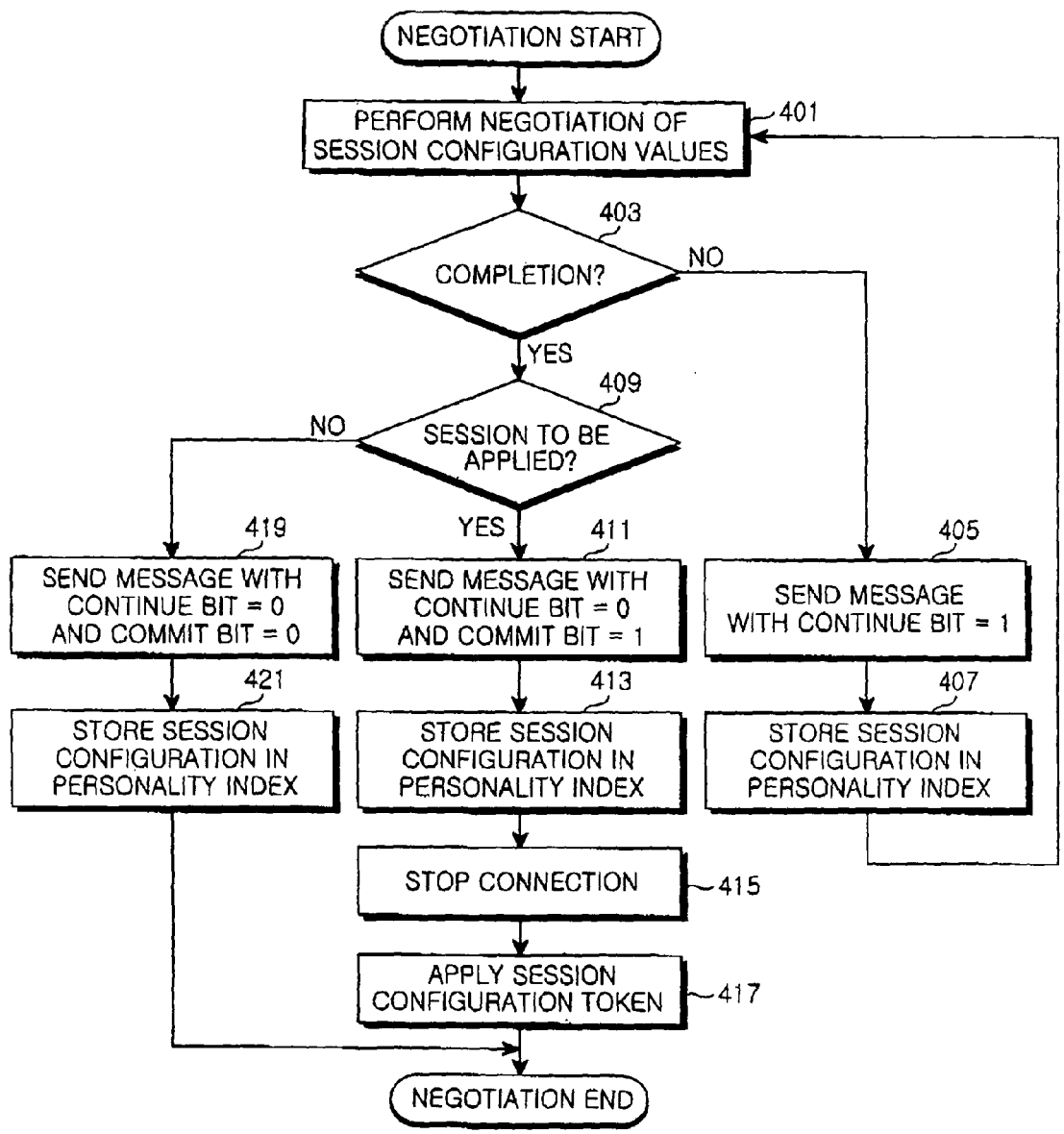
FIG. 4 is a flowchart illustrating a method for negotiating a session configuration in the AN of the high rate packet data system in accordance with another exemplary embodiment of the present invention.

FIG. 4 is a flowchart illustrating a sessions configuration process performed in the AN of the high rate packet data system in accordance with another exemplary embodiment of the present invention. Specifically, FIG. 4 illustrates the operation of the AN in a session configuration procedure in which a physical channel is not released unnecessarily.

In step 401, the AN performs protocol-by-protocol negotiations for one session configuration. After the negotiation of one session configuration is completed, the AN determines if an additional session configuration is required in step 403. If additional session negotiation is required, the AN sends a SoftConfigurationComplete message in which the Continue bit has been set to '1' in step 405. Here, the SoftConfigurationComplete message is sent to the AT whenever a session is configured. The AN sending SoftConfigurationComplete message stores a just previously negotiated session configuration in a personality index described in the SoftConfigurationComplete message. Then, the AN proceeds to step 401 to perform the next session configuration negotiation.

If all session configurations are completed and additional session negotiation is not required as a determination result in step 403, the AN determines whether to newly apply a specific session. If the specific session is newly applied, the AN sends, to the AT, the SoftConfigurationComplete message in which the Continue bit has been set to '0' and the Commit field has been set to '1' in step 411. Then, the AN stores a just previously negotiated session configuration in a personality index described in the SoftConfigurationComplete message in step 413. Then, the AN releases a physical channel set up in the session configuration currently being used in step 415. Then, the AN applies a newly changed session configuration, that is, a session configuration mapped to a SessionConfiguration-Token described in the SoftConfigurationComplete message in step 417 and then ends the session configuration process.

However, if a new session does not need to be applied as a result of the determination in step 409, the AN sends, to the AT, the SoftConfigurationComplete message in which the Continue bit and the Commit field have been set to '0', respectively, in step 419. Then, the AN stores a just previously negotiated session configuration in a personality index described in the SoftConfigurationComplete message in step 421, and then ends the session configuration process without releasing the physical channel. In accordance with the above-described exemplary embodiment, the AN can send, to the AT, information indicating if a specific session configuration is applied after the session configuration negotiation has been completed, and can maintain the existing physical channel when a previous session configuration is not changed.

Figure 5:
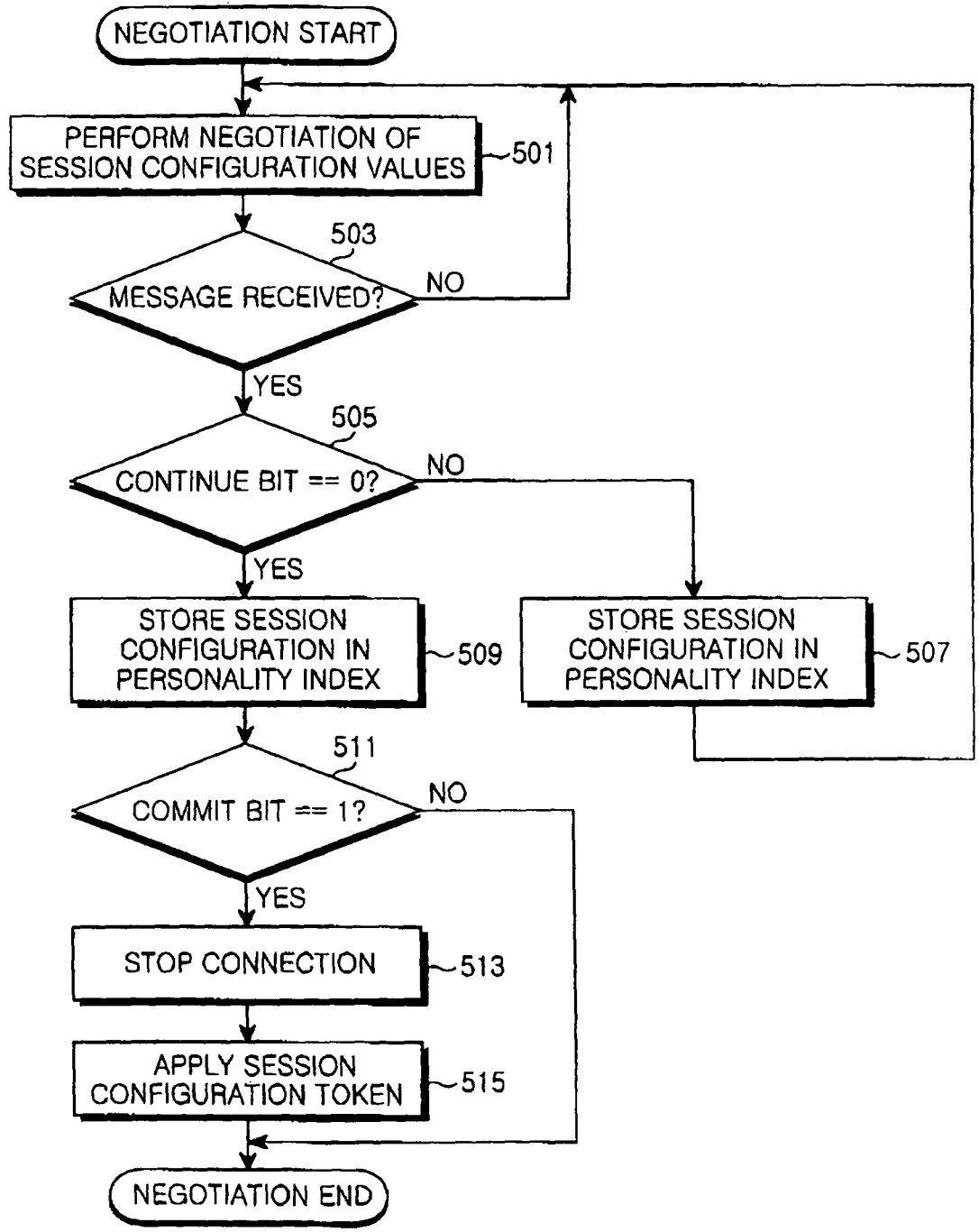
FIG. 5 is a flowchart illustrating a method for negotiating a session configuration in the AT of the high rate packet data system in accordance with another exemplary embodiment of the present invention.

FIG. 5 is a flowchart illustrating a session configuration process in the AT of the high rate packet data system in accordance with another exemplary embodiment of the present invention. Specifically, FIG. 5 illustrates the operation of the AT in a session configuration procedure in which a physical channel is not released unnecessarily.

In step 501, the AT performs protocol-by-protocol negotiations for one session configuration. When the negotiation of one session configuration is completed, the AT receives a SoftConfigurationComplete message in step 503. When receiving the SoftConfigurationComplete message in step 503, the AT determines if the Continue bit of the SoftConfigurationComplete message has been set to '0' in step 505. When the Continue bit has been set to '1', the AT stores a just previously negotiated session configuration in a personality index described in the SoftConfigurationComplete message in step 507. Then, the AT proceeds to step 501 to perform a negotiation procedure for a new session configuration.

When receiving the SoftConfigurationComplete message in which the Continue bit has been set to '1' in step 505, the AT determines that all session configurations are completed. Then, the AT stores a just previously negotiated session configuration in a personality index described in the SoftConfigurationComplete message in step 509. Then, the AT checks a value of a Commit bit and determines whether to use a new session configuration in step 511. If the Commit bit value is '1' in step 511, the AT releases a physical channel set up in it session configuration currently being used and stops a Connection to the AN in step 513. The AT applies a newly changed session configuration, that is, a session configuration mapped to a SessionConfigurationToken described in the SoftConfigurationComplete message in step 515.

If the Commit bit value is '0' in step 511, the AT immediately ends the session configuration process without releasing a physical channel set up in a session configuration currently being used. In accordance with the above-described embodiment, the AT can use a specific session configuration on the basis of information, indicating if the specific session configuration is applied, received from the AN, and can maintain the existing physical channel when a previous session configuration is not changed.

Next, a method for deleting a prestored session configuration negotiated between the AT and the AN in accordance with an exemplary embodiment of the present invention will be described.

In a method proposed in an exemplary embodiment of the present invention, the AN sends a delete session message including a personality ID or index of a session to be deleted and a transaction ID without starting a session configuration process such that a prestored session configuration is removed. When receiving the delete session message, the AT deletes session information mapped to an indicated personality index from a memory. In an exemplary implementation, the delete session message is not transmitted and received during the session configuration negotiation.

Table 2 shows an example of the delete session message for removing a prestored session configuration in accordance with the present invention.

TABLE 2

| Field | Length (bits) |
|---|---|
| MessageID | 8 |
| TransactionID | 8 |
| PersonalityCount | 4 |
| PersonalityCount + 1 instances of the following record | |
| PersonalityIndex | 0 or 4 |
| Reserved | 0 or 4 |

In Table 2, the MessageID field indicates a value of a message identifier for identifying a delete session message. The TransactionID field is used for discriminating orders of delete session messages repeatedly transmitted or delayed due to a network situation. Whenever a delete session message is transmitted, the AN, for example, increments a value of the TransactionID field by one.

In Table 2, the PersonalityCount field indicates the number of personality indices to be deleted (e.g., Number of Personality Indices—1) in the delete session message. The PersonalityIndex field indicates a personality index mapped to a session configuration to be deleted. When receiving the delete session message from the AN, the AT deletes at least one session configuration mapped to a personality index included in the message.

When receiving the delete session message, the AT deletes ac indicated session configuration and sends a response message to the AN. The AN can determine if the AT has deleted the session configuration by receiving the response message, such that the session configuration deletion can be stably performed. In this case, the AN receives the response message and then deletes its own session configuration when it is determined that the AT has deleted the session configuration.

Next, a method for updating (correcting) a prestored session configuration negotiated between the AT and the AN in accordance with an exemplary embodiment of the present invention will be described.

A method for performing a session negotiation process between the AT and the AN and updating a specific session configuration among a plurality of stored session configurations is not defined in the prior art. The session negotiation process must be totally performed even when the AT and the AN desire to correct some parameter values included in a specific session configuration. For example, when the AT and the AN store Session Configurations 1, 2, and 3 and desire to update the value of a specific parameter A of Session Configuration 2, the session negotiation process must be reperformed on all parameters of Session Configuration 2 in the prior art.

An exemplary implementation of the present invention provides a method capable of updating a specific parameter of a specific session configuration without totally reperforming a conventional session negotiation process between the AT and the AN. In an exemplary method proposed by the present invention, the AN (or AT) requesting the update of a specific parameter generates or activates a protocol using a parameter to be corrected in an associated session configuration to correct a stored session configuration value. Then, the target AT (or AN) sends an InConfiguration instance activation message to be described below, and generates or activates a protocol using an associated parameter of an associated session configuration.

Then, the AN (or AT) requesting the update of a parameter and the AT (or AN) receiving the request update a parameter value of an associated protocol rising the well-known, messages for parameter negotiation defined by the generated or activated protocol. For example, the well-known messages are an AttributeUpdateRequest message, AttributeUpdateAccept message, AttributeUpdateReject message, ConfigurationRequest message, and ConfigurationResponse message. The messages for parameter negotiation are defined in each protocol. After the update process is completed, the AN (or AT) requesting the update and the target AT (or AN) store an updated parameter of an associated protocol and other parameters of an associated session configuration in a personality index and complete the session configuration update.

In the high rate packet data system to which exemplary embodiments of the present invention may be applied, the AN (or AT) generates or activates an InConfiguration instance of a protocol using an associated parameter of session information to update a parameter (or configuration attribute) of a specific session configuration prestored through session configuration negotiation. In an exemplary implementation, the InConfiguration instance of a protocol is one independent execution unit configured by a value of a parameter defined in the protocol and a protocol operation. The generated or activated InConfiguration instance is used to negotiate parameters used in an associated protocol and only defines the minimum operation for parameter negotiation.

When the AN starts the update of a parameter (or configuration attribute) of a specific session configuration, it sends an InConfiguration instance activation message defined in an exemplary implementation of the present invention to the AT in order to generate and activate the InConfiguration instance of a protocol using an associated parameter. When the InConfiguration instance activation message is successfully sent, the AN negotiates with the AT to correct a parameter value using the messages for parameter negotiation defined in relation to an InConfiguration instance of an associated protocol. After the parameter value is completely negotiated, the AN stores an updated parameter value and other parameters of an associated session configuration in it personality index of the session configuration.

After receiving the InConfiguration instance activation message from the AN, the AT generates or activates an InConfiguration instance of a specific protocol associated with a personality index described in the InConfiguration instance activation message. Then, the AT negotiates a parameter value to be corrected using the messages for parameter negotiation defined in an associated protocol. After the parameter value is completely negotiated, the AT stores an updated parameter value and other parameters of an associated session configuration in a personality index of the session configuration.

When the AT starts the update of a parameter (or configuration attribute) of a specific session configuration in the high rate packet (data system to which exemplary implementations of the present invention may be applied, it generates or activates an InConfiguration instance of a protocol using an associated parameter of an associated session configuration to update a parameter (or configuration attribute) of a specific session configuration prestored. The AT sends, to the AN, an InConfiguration instance activation message defined in an exemplary implementation of the present invention to the AT in order to generate and activate the InConfiguration instance of a protocol in which an associated parameter of an associated session configuration is used in the AT. When the InConfiguration instance activation message is successfully sent, the AT negotiates with the AN to correct a parameter value using the messages for parameter negotiation defined in relation to an InConfiguration instance of an associated protocol. After the negotiation of the parameter value is completed, the AT stores an updated parameter value and other parameters of an associated session configuration in a personality index of the session configuration.

After receiving the InConfiguration instance activation message from the AT, the AN generates or activates an InConfiguration instance of a specific protocol associated with a personality index described in the InConfiguration instance activation message. Then, the AN negotiates a parameter value to be corrected using the messages for parameter negotiation defined in an associated protocol. After the negotiation of the parameter value is completed, the AN stores an updated parameter value and other parameters of an associated session configuration in a personality index of the session configuration.

Next, a session update method according to an exemplary embodiment of the present invention will be described in more detail with reference to FIGS. 6 and 7.

Figure 6:
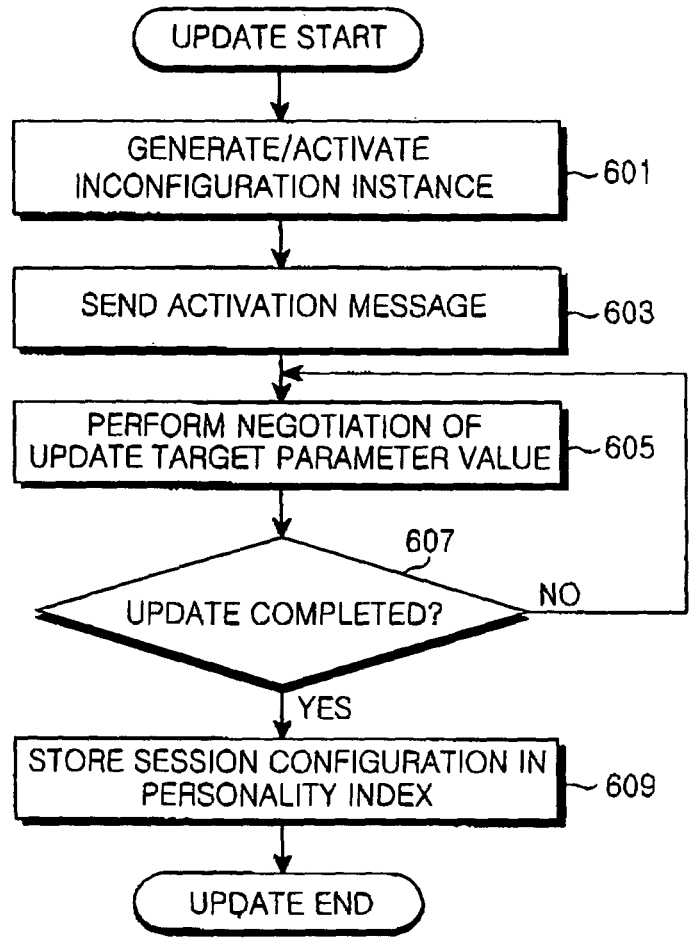
FIG. 6 is a flowchart illustrating an operation of a side for sending an InConfiguration instance activation message when a session configuration is updated in the high rate packet data system in accordance with an exemplary embodiment of the present invention.

FIG. 6 is a flowchart illustrating an operation of a side for sending an InConfiguration instance activation message when a session configuration is updated in the high rate packet data system in accordance with an embodiment of the present invention.

First, the AT (or AN) generates or activates an InConfiguration instance of a protocol using an associated parameter of a specific session configuration to be corrected when desiring to update the parameter of the specific session configuration prestored in step 601. The AT (or AN) starting the update sends an InConfiguration instance activation message defined in the present invention to a target AN (or AT) to generate or activate an InConfiguration instance of a protocol in which an associated parameter of a specific session configuration is used in the target AN (or AT) in step 603.

When the InConfiguration instance activation message is successfully sent, the AN (or AN) negotiates with the target AN (or AT) on a parameter value to be corrected by using the messages for parameter negotiation defined in relation to an InConfiguration instance of an associated protocol in step 605. If the negotiation of the parameter value is completed in step 607, the AT (or AN) stores an updated parameter value and other parameters of an associated session configuration in a personality index of the session configuration in step 609.

Figure 7:
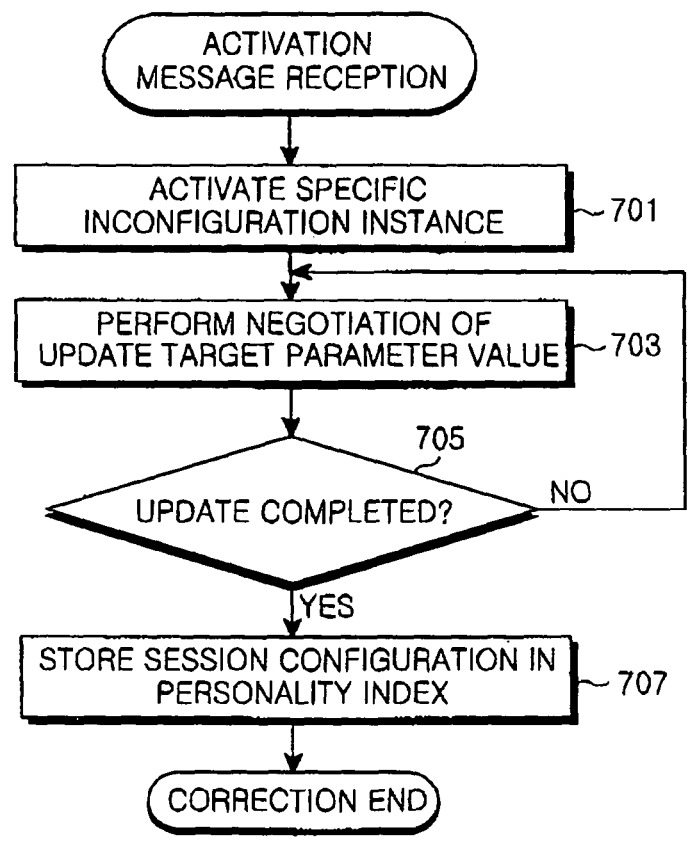
FIG. 7 is a flowchart illustrating an operation of a side for receiving an InConfiguration instance activation message when a session configuration is updated in the high rate packet data system in accordance with an exemplary embodiment of the present invention.

FIG. 7 is a flowchart illustrating an operation of a side for receiving an InConfiguration instance activation message when a session configuration is updated in the high rate packet data system in accordance with an exemplary embodiment of the present invention.

When receiving an InConfiguration instance activation message from an AT (or AN) requesting the update of a specific parameter of a session configuration a target AN (or AT) generates or activates an InConfiguration instance of an update target protocol of a specific session configuration associated with a personality index and a protocol type included in the received InConfiguration instance activation message in step 701.

For a parameter value to be corrected, the target AN (or AT) negotiates with the AT (or AN) requesting the update using the messages for parameter negotiation defined in an associated protocol in step 703. After the negotiation of the parameter value is completed in step 705, the target AN (or AT) stores an updated parameter value and other parameters of an associated session configuration in a personality index of the session configuration in stop 707.

Next, a method for updating (correcting) a session configuration prestored through the negotiation between the AT and the AN in accordance with another exemplary embodiment of the present invention will be described.

In the other exemplary embodiment of the present invention, the AT (or AN) sends a request for updating a specific configuration attribute (hereinafter, referred to as a PersonalityUpdateRequest message) to the target AN (or AT). In an exemplary implementation, the configuration attribute specifies a protocol type of a specific session configuration indicated by a personality index.

When the target AN (or AT) determines whether to use an associated configuration attribute value and desires to use a requested configuration attribute value, it sends, to the AT (or AN) requesting the update, a response representing acceptance to the update request (hereinafter, referred to as a PersonalityUpdateAccept message). However, if a requested Configuration attribute is not used, a response representing rejection to the update request (hereinafter, referred to as a PersonalityUpdateReject message) is sent to the AT (or AN) requesting the update. Accordingly, the AT or AN can update a prestored configuration attribute value by repeating the above-described operation.

Table 3 shows an example of fields of the PersonalityUpdateRequest message proposed to update the session configuration in the present invention.

TABLE 3

| Field | Length (bits) |
|---|---|
| MessageID | 8 |
| TransactionID | 8 |
| PersonalityIndex | 4 |
| Type | 7 or 15 |
| Reserved | 5 |
| One or more instances of the following record | |
| AttributeRecord | Attribute dependent |

In Table 3, the MessageID field indicates a message type, and is set as an identifier mapped to the PersonalityUpdateRequest message. The TransactionID field is used to discriminate a pair of the PersonalityUpdateRequest message and its response message. When receiving the response message (i.e., PersonalityUpdateAccept/Reject message) to the update request, the AN or AT identifies a TransactionID included in the response message and determines the response message as a response to the PersonalityUpdateRequest message with the identical TransactionID.

In Table 3, the PersonalityIndex field is used to indicate a personality index for a configuration attribute associated with the update request. The protocol Type field is used to indicate a type of protocol to which the configuration attribute associated with the update request belongs. The AN or AT requesting the update describes, in the AttributeRecord field of Table 3, at least one configuration attribute to be updated in the protocol type of the personality index and transmits the message.

When the AttributeRecord field is configured in accordance with an exemplary embodiment, it can be limited such that the AN or AT proposes only one value for one configuration attribute. The AN or AT sending the PersonalityUpdateRequest message may be limited such that a session configuration of a personality index currently being used cannot be updated using the message. Alternatively, at least two configurations attributes cannot be included and transmitted in the PersonalityUpdateRequest message.

When receiving the PersonalityUpdateRequest message, the AT (or AN) determines whether to use at configuration attribute value proposed by an opposite AN (or AT), and sends the PersonalityUpdateAccept or PersonalityUpdateReject message as a response message. Tables 4 and 5 show field structures of the PersonalityUpdateAccept message and the PersonalityUpdateReject message corresponding to the response messages to the PersonalityUpdateRequest message, respectively.

TABLE 4

| Field | Length (bits) |
|---|---|
| MessageID | 8 |
| TransactionID | 8 |

TABLE 5

| Field | Length (bits) |
|---|---|
| MessageID | 8 |
| TransactionID | 8 |

The PersonalityUpdateAccept message and the PersonalityUpdateReject message have the same structure including the MessageID field and the TransactionID field. The two messages are sent to an opposite AN or AT to indicate acceptance and rejection to the update request of a configuration attribute mapped to the described transactionID. Because the two messages have the same Structure but have different message IDs, the opposite AN or AT can distinguish the two messages.

Next, a session update method in accordance with another exemplary embodiment of the present invention will be described in more detail with reference to FIGS. 8 and 9.

Figure 8:
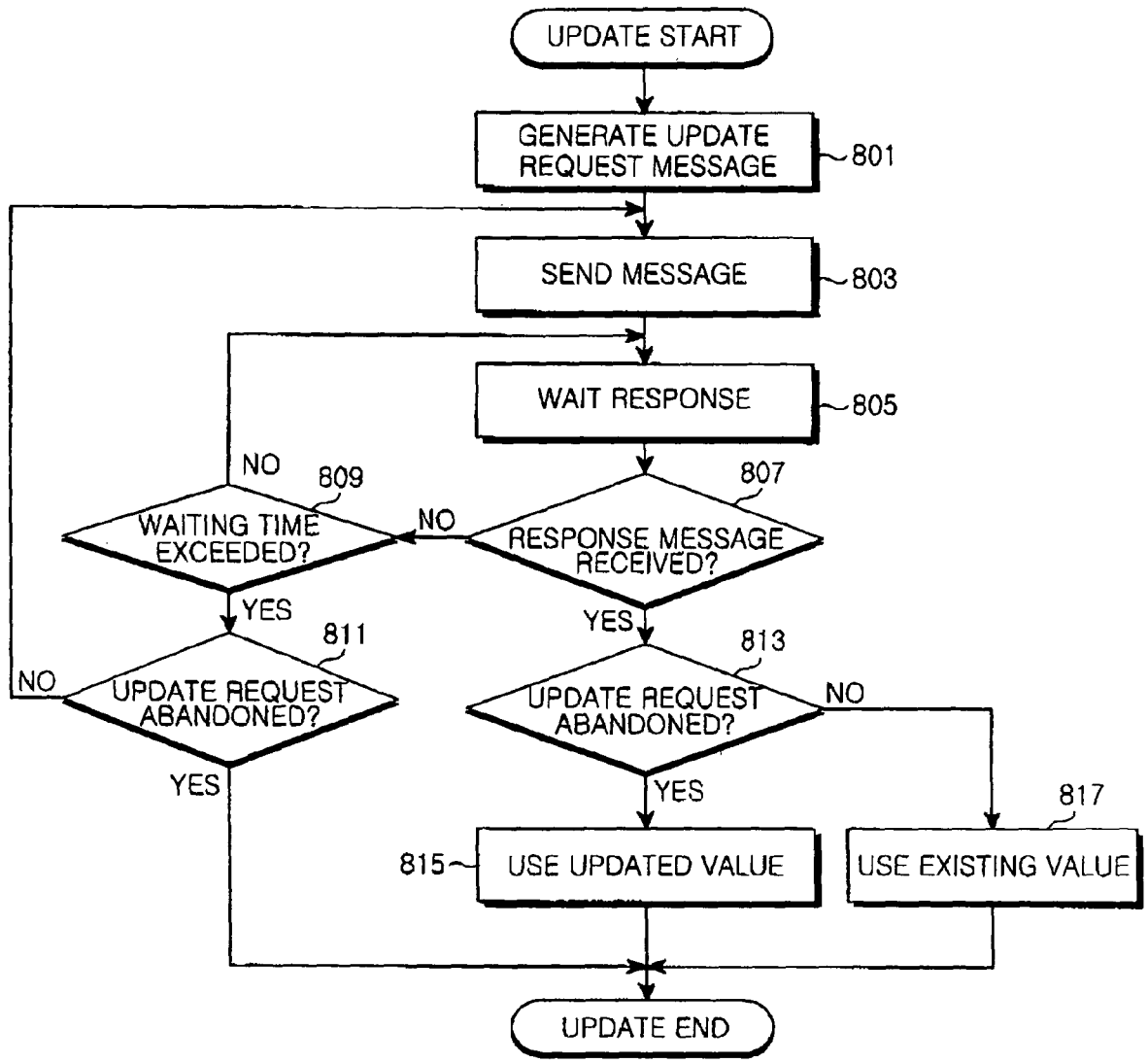
FIG. 8 is a flowchart illustrating an operation of a side for sending it PersonalityUpdateRequest message when a session configuration is updated in the high rate packet data system in accordance with another exemplary embodiment of the present invention.

FIG. 8 is a flowchart illustrating an operation of a side for sending a PersonalityUpdateRequest message when a session configuration is updated in the high rate packet data system in accordance with another exemplary embodiment of the present invention.

First, the AN (or AT) desiring to update at session configuration sends a PersonalityUpdateRequest message as shown in Table 3. For this, the AN (or AT) desiring to update a prestored session configuration identifies a personality index of an associated session configuration, identifies a type of protocol to which au update target configuration attribute belongs, and generates, for example, a PersonalityUpdateRequest message as shown in Table 3 in step 801. Then, the AN (or AT) requesting the update sends the PersonalityUpdateRequest message to a target AT (or AN) in step 803.

After requesting the update, the AN (or AT) waits a response message to be received from the target AT (or AN) in steps 805 and 807. When the AN (or AT) does not receive the response message, it determines if a preset waiting time has been exceeded. If the preset waiting time has not been exceeded, the AN (or AT) proceeds to step 805 to continuously perform the waiting operation, However, if the response message is not received from the target AT (or AN) during the preset waiting time in step 809, the AN (or AT) requesting the update determines whether to give up an associated update request in step 811.

When the AN (or AT) does not give up the associated update request in step 811, it proceeds to step 803 to resend the PersonalityUpdateRequest message. However, when the AN (or AT) gives Up the associated update request, an operation for updating the session configuration is ended. When the response message is received from the target AT (or AN) within the preset waiting time in step 807, the AN (or AT) requesting the update determines if an associated response message is a PersonalityUpdateAccept message for accepting the update request or a PersonalityUpdateReject message for rejecting the update request in step 813.

If the response message is the PersonalityUpdateAccept message as a determination result in step 813, the AN (or AT) requesting the update uses a configuration attribute value proposed in the PersonalityUpdateRequest message in step 815. However, if the response message is the PersonalityUpdateReject message as a determination result in step 813, the AN (or AT) continuously maintains and uses an existing configuration attribute value in step 817.

Figure 9:
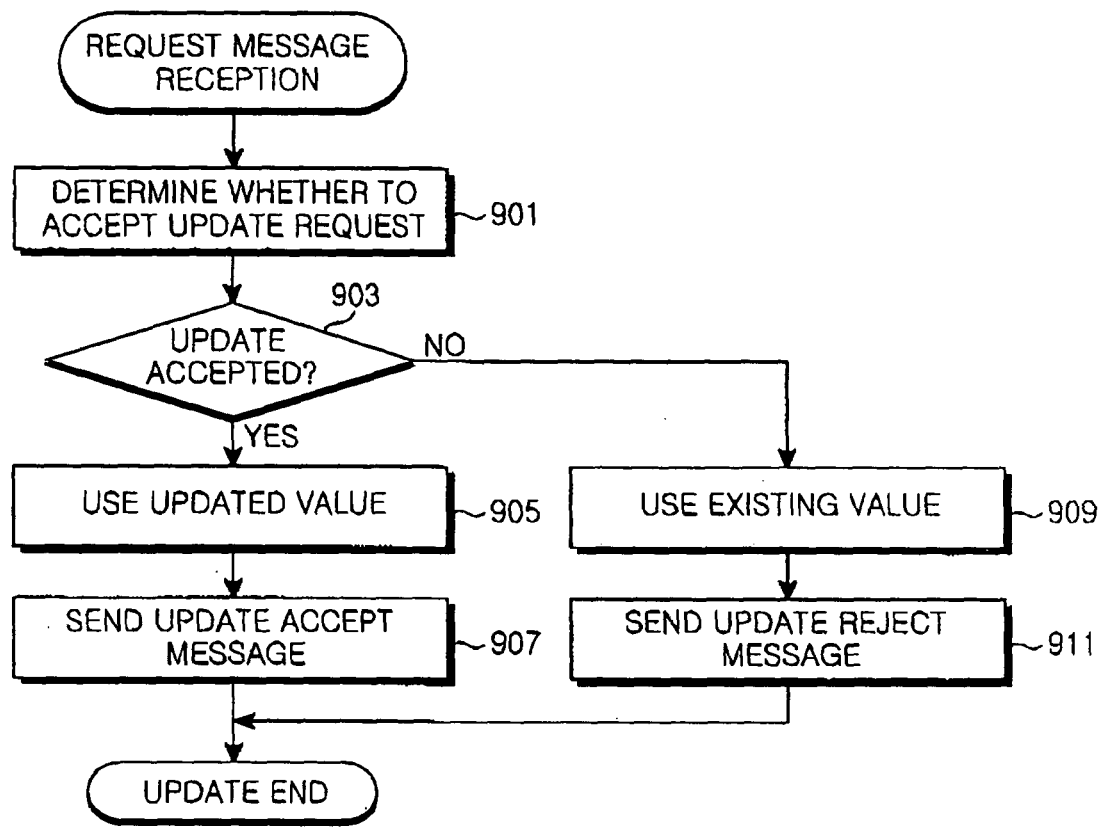
FIG. 9 is a flowchart illustrating an operation of a side for receiving a PersonalityUpdateRequest message when a session configuration is updated in the high rate packet data system in accordance with another exemplary embodiment of the present invention.

FIG. 9 is a flowchart illustrating an operation of a side for receiving a PersonalityUpdateRequest message when a session configuration is updated in the high rare packet data system in accordance with another embodiment of the present invention.

When receiving the PersonalityUpdateRequest message, the target AT (or AN) determines whether to use a configuration attribute value proposed in the PersonalityUpdateRequest message in step 901. When the target AT (or AN) desires to use the proposed configuration attribute value, it updates an existing configuration attribute value of an associated parameter to the proposed configuration attribute value in step 905. Then, a PersonalityUpdateAccept message is sent to the AN (or AT) requesting the update in step 907. When the proposed configuration attribute value is not used, the target AT (or AN) maintains the existing configuration attribute value of the associated parameter in step 909. Then, a PersonalityUpdateReject message is sent to the AN (or AT) requesting the update in step 911.

In accordance with the above-described exemplary embodiment, the AN (or AT) sends a request for updating a configuration attribute value for a specific parameter to the opposite AT or AN. When the request is accepted, a session negotiation process for all parameters is not reperformed but only the specific parameter can be designated and updated.

Next, a structure of a communication system to which an exemplary session configuration/update/deletion method as described in relation to FIGS. 2 to 9 may be applied will be described with reference to FIG. 10.

Figure 10:
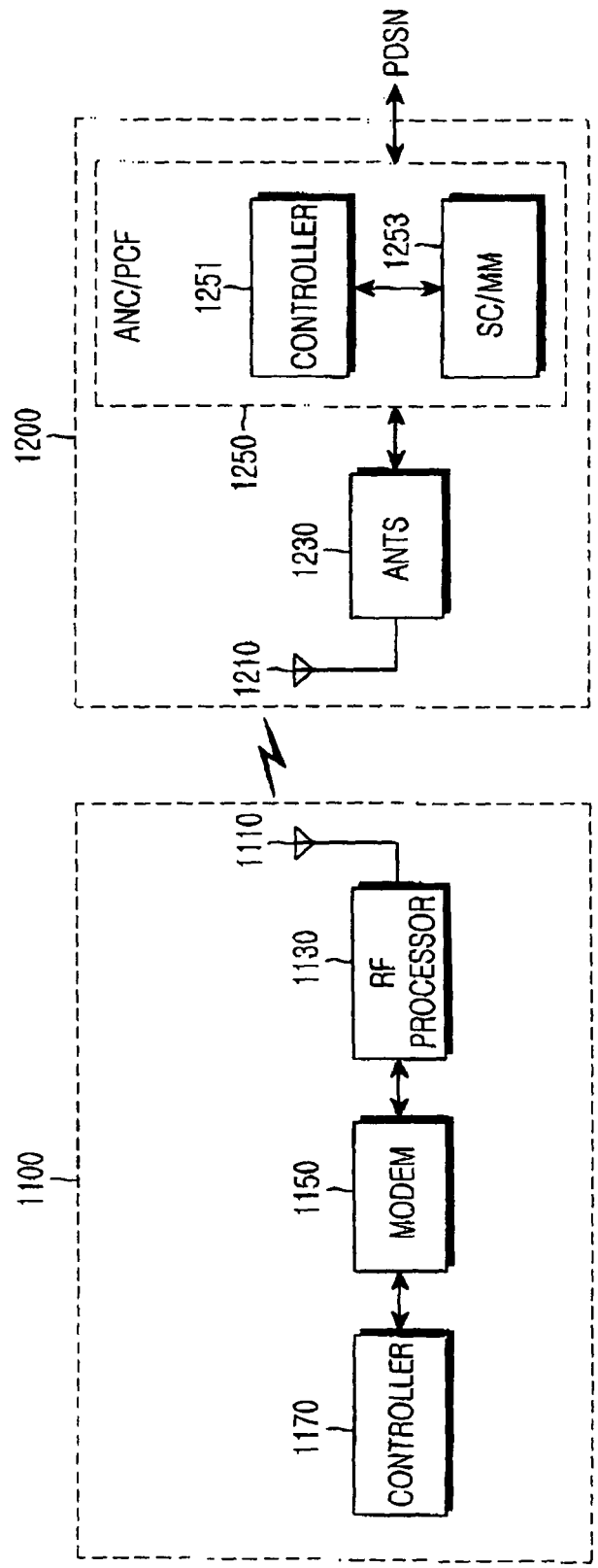
FIG. 10 is a block diagram illustrating an example of a structure of a high rate packet data system which may implement an exemplary embodiment of the present invention.

FIG. 10 is a block diagram illustrating a structure of the high rate packet data system to which exemplary embodiments of the present invention may be applied. For example, FIG. 10 illustrates a structure of a 1xEV-DO network.

The communication system of FIG. 10 includes an AT 1100 of the user and ant AN 1200 for transmitting data to and receiving data from the AT 1100 through a wireless network. The AN 1200 is provided with an access network transceiver system (ANTS) 1230 and an access network controller (ANC) 1250 configuring a radio access network (RAN) of the 1xEV-DO network. The AN 1200 is connected to a packet data serving node (PDSN) for managing PPP session for IP network access of the AT 1100. Forward data received from an IP network is sent to the AT 1100 through the AN 1200, and reverse data of the AT 1100 received through the AN 1200 is sent to the IP network.

In FIG. 10, the AT 1100 and the AN 1200 perform session negotiation in the methods proposed in FIGS. 2 to 9 and are provided with a predetermined session negotiation algorithm for configuring/updating/deleting a session. A packet control function (PCF) entity for controlling a packet flow as well as the ANC 1250 of the AN 1200 can control the session negotiation. In an exemplary implementation, it is assumed that the AN 1200 includes the PCF entity in a broad sense.

First, the AT 1100 of the FIG. 10 is provided with an antenna 1110 for transmitting and receiving a radio signal, a radio frequency (RF) processor for performing conventional RF processing by up-converting the frequency of a signal to be transmitted or down-converting the frequency of a received signal, and a modulator-demodulator (MODEM) for processing a baseband signal to encode and modulate the signal to be transmitted or demodulate and decode the received signal. The controller 1170 of the AT 1100 not only performs the overall control operation for transmitting and receiving packet data, but also controls an operation for negotiating sessions required for communication with the AN 1200 and configuring/updating/deleting session information.

The controller 1170 generates session negotiation-related information for session negotiation with the AN 1200 in a designated message format or extracts session negotiation-related information from a received message. Moreover, the controller 1170 stores/updates/deletes associated information of an internal memory or special memory (not illustrated) according to an operation for configuring/updating/deleting session information and parameters associated therewith.

In the AN 1200 of FIG. 10, the ANTS 1230 transmits a radio signal to and receives a radio signal from the AT 1100 through an antenna 1210. Moreover, the ANTS 1230 may include an RF processor for transmitting and receiving a message or user data, a data queue for storing a received message or user data, and a controller for selecting and transmitting data of a specific user or queue while considering an amount of data of each queue, a channel state of the AT 1100, service characteristics, fairness, and so on although they are not illustrated. Because these components are not directly associated with the present invention their description is omitted.

In the AN 1200 of FIG. 10, a controller 1251 of the ANC 1250 controls the operation of a plurality of ANTSs 1230 for performing radio communication with the AT 1100 and manages radio resources. The controller 1251 receives various messages for session negotiation to be transmitted to the AT 1100 from a session control/mobility management (SC/MM) entity 1253 and sends the received messages to the ANTS 1230. The controller 1251 receives various messages for session negotiation from the AT 1100 through the ANTS 1230 and sends the received messages to the SC/MM entity 1253. Moreover, the controller 1251 selects the ANTS 1230 connected to an associated AT 1100 and transmits data received from the PDSN. The controller 1251 transmits data received from the AT 1100 to the PDSN.

For negotiation with the AT 1100, the SC/MM entity 1253 generates session negotiation-related information in a predefined message format or extracts session negotiation-related information from a received message. Moreover, the SC/MM entity 1253 stores/updates/deletes associated information of an internal memory or a special memory (not illustrated) according to an exemplary operation for configuring/updating/deleting session information and parameters associated therewith. When session negotiation with the AT 1100 is controlled by the PCF entity rather than the ANC, the SC/MM entity 1253 can be provided in the PCF entity. For convenience of explanation, the SC/MM entity 1253 provided in the ANC or PCF entity is referred to as the SC/MM entity 1253 of the AN 1200.

Now, a session negotiation operation between the AT 1100 and the AN 1200 in the communication system of FIG. 10 will be described with reference to certain exemplary embodiments.

In the case of the examples of FIGS. 2 and 3 corresponding to the first embodiment, the controller 1170 of the AT 1100 may receive, from the AN 1200, a SoftConfigurationComplete message in which a Continue bit has been set to '0' after a session configuration is completed. A determination is made as to whether a personality index of a session configuration currently being used indicates the same session as indicated by a SessionConfigurationToken of the SoftConfigurationComplete message and another session configuration has been overwritten on the session configuration currently being used. If the session configuration currently being used has not been changed as a determination result, the controller 1170 stops the session configuration negotiation without releasing a physical channel, that is, a traffic channel. Moreover, the controller 1170 of the AT 1100 can stop the session configuration negotiation without releasing the traffic channel if recovery of a previous session is not agreed between the AT and the AN in an additional condition.

When the SC/MM entity 1253 of the AN 1200 completes all session configurations associated with the AT 1100 and determines that additional session negotiation is not required, a determination is made as to whether a personality index of a session configuration currently being used indicates the same session as indicated by a SessionConfigurationToken of the SoftConfigurationComplete message and the personality index of the session configuration currently being used has been reset in a previous session negotiation process. If the session configuration currently being used has not been charged as a determination result, the SC/MM entity 1253 stops the session configuration negotiation without releasing a physical channel, i.e., a traffic channel. However, when the above-described conditions are not satisfied, the AT 1100 and the AN 1200 determine that the session configuration currently being used has been changed, release the traffic channel set up in the session configuration currently being used, and use a newly changed session configuration.

In the case of the examples of FIGS. 4 and 5 corresponding to the second exemplary embodiment, the SC/MM entity 1253 of the AN 1200 designates information indicating if a session configuration is applied and sends the designated information to the AT 1100. After all session configurations are completed, the controller 1170 of the AT 1100 receives, for example, a SoftConfigurationComplete message in which a Continue bit has been set to '0' from the AN 1200. Then, the controller 1170 can determine if a specific session configuration is applied by checking a Commit field sent along with the Continue bit as shown in Table 1. When the SC/MM entity 1253 of the AN 1200 indicates that the specific session configuration is applied, the AT 1100 releases the traffic channel and uses the session configuration indicated by the AN 1200. When it is not indicated that the specific session configuration is applied, the AT 1100 completes the session configuration negotiation without releasing the traffic channel.

When the session configuration negotiation is completed, the SC/MM entity 1253 of the AN 1200 sends the SoftConfigurationComplete message in which the Continue bit has been set to '0'. When a session configuration mapped to a specific personality index is negotiated and applied, the SC/MM, entity 1253 sends, to the AT 11100, the SoftConfigurationComplete message including a Commit bit set to '1' and a SessionConfigurationToken mapped to a personality index to be applied. Then, the AN 1200 uses a session configuration of the personality index mapped to the sent SessionConfigurationToken. In this process, the traffic channel is released. However, when the session configuration currently being used is desired to be continuously used after the negotiation, the SC/MM 1253 of the AN 1200 sends, to the AT 1100, the SoftConfigurationComplete message in which the Continue bit has been set to '0' and continuously maintains the session configuration currently being used.

A third exemplary embodiment is an exemplary implementation where a session configuration prestored in the AT 1100 and the AN 1200 is deleted. The SC/MM entity 1253 of the AN 1200 sends, to the AT 1100, a delete session message including a personality index of a session to be deleted and a TransactionID as shown in Table 2 such that configured session information can be deleted. When receiving the delete session message, the controller 1170 of the AT 1100 deletes session information mapped to the personality index from the memory. In an exemplary implementation, the number of session configurations to be deleted can be designated in the PersonalityCount field of Table 2. In the PersonalityCount filed, a plurality of session configurations to be deleted may be designated.

In an exemplary implementation, the controller 1170 of the AT 1100 receiving the delete session message deletes an indicated session configuration and sends a response message to the AN 1200. When receiving the response message, the SC/MM entity 1253 of the AN 1200 identifies the session configuration deletion of the AT 1100 and deletes its own session configuration.

In the case of the examples of FIGS. 6 and 7 corresponding to the fourth exemplary embodiment, the AT 1100 (or the AN 1200) desiring to update a specific parameter of a specific session configuration sends an InConfiguration instance activation message to the large AN 1200 (or the target AT 1100) such that an InConfiguration instance of a protocol using the update target parameter (or configuration attribute) of the specific session configuration can be generated or activated. Then, the AT 1100 (or the AN 1200) desiring the update negotiates with the target AN 1200 (or the target AT 1100) on the update target parameter using predetermined messages for parameter negotiation defined in relation to an InConfiguration instance of an associated protocol. After the negotiation of the update target parameter value is completed, the AT 1100 (or the AN 1200) desiring the update stores the negotiated parameter value and other parameters of an associated session configuration in a personality index thereof.

When receiving the InConfiguration instance activation message, the target AN 1200 (or the target AT 1100) generates or activates an InConfiguration instance of an update target protocol mapped to a personality index indicated by the InConfiguration instance activation message. After the negotiation of a parameter value is completed, the target AN 1200 (or the target AT 1100) stores a negotiated and updated parameter value and other parameters of an associated session configuration in a personality index thereof.

The case of the examples of FIGS. 8 and 9 corresponding to the fifth exemplary embodiment will be described. When desiring to update a configuration attribute for a specific parameter of a specific session configuration, the AT 1100 (or the AN 1200) sends a PersonalityUpdateRequest message as shown in Table 3 to the target AN 1200 (or the target AT 1100) in order to request the update of an associated configuration attribute. In an exemplary implementation, the configuration attribute specifies a protocol of a specific session configuration indicated by a personality index. A configuration attribute value to be updated is sent in the AttributeRecord field of Table 3.

When the target AN 1200 (or the target AT 1100) receives the PersonalityUpdateRequest message, determines whether to use an associated configuration attribute value, and desires to use the requested configuration attribute value, it sends a PersonalityUpdateAccept message for accepting the update request to the AT 1100 (or the AN 1200) requesting the update. However, when the target AN 1200 (or the target AT 1100) does not use the requested configuration attribute value, it sends a PersonalityUpdateReject message for rejecting the update request to the AT 1100 (or the AN 1200) requesting the update. Therefore, the AT 1100 or the AN 1200 can update a prestored configuration attribute value through a repeated operation.

As is apparent from the above description, exemplary embodiments of the present invention can reduce a repeated procedure when the session is negotiated between an AT and an AN in a high rate packet data system, thereby significantly reducing the session configuration/correction time.

Moreover, exemplary embodiments of the present invention can exclude an operation for unnecessarily releasing a traffic channel when the session is negotiated between the AT and the AN.

Moreover, exemplary embodiments of the present invention can send information indicating if a specific session configuration is applied from the AN to the AT after the session configuration negotiation is completed between the AN and AT.

Moreover, exemplary embodiments of the present invention can partially update some parameters of specific session information and can select and remove only the desired one of all sessions, when the session is negotiated between the AT and the AN.

Although certain exemplary embodiment of the present invention have been disclosed For illustrative purposes, those skilled in the art will appreciate that various modifications, additions, and substitutions are possible, without departing from the scope of the present invention which is defined by the following claims, along with their full scope of equivalents.

What is claimed is:

1. A method for performing session configuration negotiation in an access network of a high rate packet data system for mobile communication, the method comprising the steps of:
   performing protocol-by-protocol negotiations with an access terminal for a session configuration;
   sending, to the access terminal, a soft configuration complete message comprising a session commit bit indicating if a new session is applied when all session configurations have been completed;
   releasing a physical channel associated with the access terminal when the session commit bit indicates that the new session is applied; and
   maintaining the physical channel associated with the access terminal when the session commit bit indicates that a session currently in use is maintained,
   wherein the soft configuration complete message further comprises a session configuration continue bit indicating if an additional session configuration is required, and wherein the session commit bit is omitted when the session configuration continue bit indicates that the additional session configuration is required.

2. The method of claim 1, the session commit bit is set to indicating the new session is applied when a session configuration currently in use has been changed.

3. The method of claim 1, wherein the session commit bit is set to indicate that the new session is applied when a personality index indicated by a session configuration token of the soft configuration complete message is different to a personality index of a session currently in use.

4. The method of claim 1, wherein the session commit bit is set to indicate that the new session is applied when the personality of the session configuration currently in use has been updated in a previous session negotiation process.

5. The method of claim 1, wherein the session commit bit is set to indicate that the new session is applied when the access terminal has negotiated with the access network on recovery of a previous session configuration.

6. The method of claim 1, wherein the soft configuration complete message further comprises a session configuration token field indicating a personality index of a session configuration to be applied when the session commit bit is set to indicating the new session is applied.

7. The method of claim 6, wherein the session configuration token field include the personality index of the session configuration to be applied in a 4 most-significant bits.

8. The method of claim 6, further comprising: applying a session configuration mapped to the session configuration token when the session commit bit indicates that the new session is applied.

9. A method for performing session configuration negotiation in an access terminal of a high rate packet data system for mobile communication, the method comprising the steps of:
   performing protocol-by-protocol negotiations with an access network for a session configuration;
   receiving, from the access network, a soft configuration complete message comprising a session commit bit indicating if a new session is applied when all session configurations have been completed;
   releasing a physical channel associated with the access network when the session commit bit indicates that the new session is applied; and
   maintaining the physical channel associated with the access network when the session commit bit indicates that a session currently in use is maintained,
   wherein the soft configuration complete message further comprises a session configuration continue bit indicating if an additional session configuration is required, and wherein the session commit bit is omitted when the session configuration continue bit indicates that the additional session configuration is required.

10. The method of claim 9, wherein the soft configuration complete message further comprises a session configuration token field indicating a personality index of a session configuration to be applied when the session commit bit is set to indicating the new session is applied.

11. The method of claim 10, wherein the session configuration token field include the personality index of the session configuration to be applied in a 4 most-significant bits.

12. The method of claim 10, further comprising: applying a session configuration mapped to the session configuration token when the session commit bit indicates that the new session is applied.

13. A method for performing session configuration negotiation between an access terminal and an access network in a high rate packet data system for mobile communication, the method comprising the steps of:

performing protocol-by-protocol negotiations for a session configuration between the access terminal and the access network;

sending, to the access terminal, a soft configuration complete message comprising a session commit bit indicating that a new session is applied in the access network when all session configurations have been completed; and determining whether to maintain or release a physical channel in the access terminal and the access network on a basis of the session commit bit of the soft configuration complete message, wherein the soft configuration complete message further comprises a session configuration continue bit indicating if an additional session configuration is required, and wherein the session commit bit is omitted when the session configuration continue bit indicates that the additional session configuration is required.

14. A method for deleting a session configuration between an access network and an access terminal in a high rate packet data system for mobile communication, the method comprising the steps of:

sending a predetermined delete session message comprising a personality index indicating a session configuration to be deleted from a transmitting side of the access network and the access terminal to a receiving side;

deleting an associated session configuration mapped to the personality index in the receiving side that receives the delete session message, sending an acknowledgement message from the receiving side receiving the delete session message to the transmitting side; and deleting an associated session configuration in the transmitting side receiving the acknowledgement message.

15. The method of claim 14, wherein the delete session message further comprises a field for indicating the number of session configurations to be deleted.

16. An access network for negotiating a session configuration to communicate with at least one access terminal in a high rate packet data system for mobile communication, the network comprising:

an access network controller (ANC) for controlling an access network transceiver system (ANTS) for transmitting a radio signal to, and receiving a radio signal from, the at least one access terminal, the ANC comprising: control means for negotiating with the at least one access terminal on at least one session configuration, sending, to the at least one access terminal, a soft configuration complete message comprising a session commit bit indicating if a new session is applied when all session configurations have been completed, maintaining a preset physical channel associated with the at least one access terminal when a current session configuration is continuously used and releasing the physical channel associated with the access terminal when the session commit bit indicates that the new session is applied, wherein the soft configuration complete message further comprises a session configuration continue bit indicating if an additional session configuration is required, and wherein the session commit bit is omitted when the session configuration continue bit indicates that the additional session configuration is required.

17. The access network of claim 16, wherein the soft configuration complete message further comprises a session configuration token field indicating a personality index of a session configuration to be used when all the session configurations have been completed.

18. The access network of claim 16, the session commit bit is set to indicating the new session is applied when a session configuration currently in use has been changed.

19. The access network of claim 17, the session configuration token field include the personality index of the session configuration to be applied in a 4 most-significant bits.

20. The access network of claim 19, wherein when the session commit bit indicates that the new session is applied, the control means applies a session configuration mapped to the session configuration token.

21. The access network of claim 18, wherein the control means comprises a session control/mobility management (SC/MM) entity provided in the ANC of a Ix Evolution Data Only (IxEV-DO) network.

22. The access network of claim 18, wherein the control means comprises a session control/mobility management (SC/MM) entity provided in a packet control function (PCF) entity of a Ix Evolution Data Only (IxEV-DO) network.

23. An access terminal for negotiating a session configuration to communicate with an access network in a high rate packet data system for mobile communication, the terminal comprising:

a radio frequency (RF) processor for frequency converting an RF signal to be transmitted to and received from an access network;

a modulator-demodulator (MODEM) for processing a baseband signal of a message to be transmitted to and received from the access network; and a controller for negotiating with the access network on at least one session configuration, receiving, from the access network, a soft configuration complete message comprising a session commit bit indicating if a new session configuration is applied when all session configurations have been completed, maintaining a preset physical channel associated with the access network when the current session configuration is continuously used according to a result of checking the session commit bit and releasing a physical channel associated with the access network when the session commit bit indicates that the new session is applied, wherein the soft configuration complete message further comprises a session configuration continue bit indicating if an additional session configuration is required, and wherein the session commit bit is omitted when the session configuration continue bit indicates that the additional session configuration is required.

24. The access terminal of claim 23, wherein the soft configuration complete message comprises a session configuration token field indicating a personality index of a session configuration to be used when all the session configurations have been completed.

25. The access terminal of claim 24, wherein when the session commit bit indicates that the new session is applied, the controller applies a session configuration mapped to the session configuration token.

26. An access network for negotiating a session configuration to communicate with at least one access terminal in a high rate packet data system for mobile communication, the network comprising:

an access network controller (ANC) for controlling an access network transceiver system (ANTS) for transmitting a radio signal to and receiving a radio signal from at least one access terminal, the ANC comprising: control means for negotiating with the at least one access terminal on at least one session configuration, sending, to the at least one access terminal, a predetermined delete session message comprising a personality index indicating at least one session configuration to be deleted when the at least one session configuration to be deleted is present in at least one session configuration, and deleting the at least one indicated session configuration from a memory, wherein the control means performs a deletion of an associated session configuration after receiving a response message to the delete session message from the at least one access terminal.

27. An access terminal for negotiating a session configuration to communicate with an access network in a high rate packet data system for mobile communication, the terminal comprising:

a radio frequency (RF) processor for frequency converting an RF signal to be transmitted to and received from an access network; a modulator-demodulator (MODEM) for processing a baseband signal of a message to be transmitted to and received from the access network; and a controller for negotiating with the access network on at least one session configuration, and deleting at least one indicated session configuration from a memory when receiving, from the access network, a predetermined delete session message comprising a personality index indicating at least one session configuration to be deleted, wherein the controller sends, to the access network, a response message to the delete session message and the access network performs a deletion of an associated session configuration after receiving the response message.

* * * * *